(12) United States Patent
Lim et al.

(10) Patent No.: US 8,553,761 B2
(45) Date of Patent: Oct. 8, 2013

(54) CODING METHOD, DECODING METHOD, CODING APPARATUS, DECODING APPARATUS, PROGRAM, AND INTEGRATED CIRCUIT

(75) Inventors: Chong Soon Lim, Singapore (SG); Takahiro Nishi, Nara (JP); Youji Shibahara, Osaka (JP)

(73) Assignee: Panasonic Corporation, Osaka (JP)

( * ) Notice: Subject to any disclaimer, the term of this patent is extended or adjusted under 35 U.S.C. 154(b) by 39 days.

(21) Appl. No.: 13/249,469

(22) Filed: Sep. 30, 2011

(65) Prior Publication Data

US 2012/0020414 A1    Jan. 26, 2012

Related U.S. Application Data

(63) Continuation of application No. 12/792,899, filed on Jun. 3, 2010, which is a continuation of application No. PCT/JP2010/000261, filed on Jan. 19, 2010.

(30) Foreign Application Priority Data

Jan. 19, 2009   (JP) ................................. 2009-009391

(51) Int. Cl.
*H04N 7/12*   (2006.01)
*H04N 11/02*   (2006.01)
*H04N 11/04*   (2006.01)

(52) U.S. Cl.
USPC .................................................... 375/240.01

(58) Field of Classification Search
USPC .................................................... 375/240.01
See application file for complete search history.

(56) References Cited

U.S. PATENT DOCUMENTS

| 5,510,840 | A  | 4/1996  | Yonemitsu  |
| 7,136,415 | B2 | 11/2006 | Yun et al. |
| 2003/0095177 | A1 | 5/2003 | Yun et al. |

(Continued)

FOREIGN PATENT DOCUMENTS

| CN | 1520179 | 8/2004 |
| EP | 1 524 859 A2 | 4/2005 |

(Continued)

OTHER PUBLICATIONS

Office Action mailed Dec. 13, 2011 in corresponding Australian Application No. 2011250757.

(Continued)

*Primary Examiner* — David Czekaj
*Assistant Examiner* — Chikaodili E Anyikire
(74) *Attorney, Agent, or Firm* — Wenderoth, Lind & Ponack, L.L.P.

(57) ABSTRACT

A coding method includes: defining an access unit; and coding each of the pictures included in the access unit, for each access unit. The defining includes: determining a unit of coding for determining whether the pictures included in the access unit are to be uniformly coded on a per-field basis or on a per-frame basis; and determining a field type for determining whether the pictures are to be uniformly coded as top fields or bottom fields when it is determined that the pictures included in the access unit are to be coded on a per-field basis. In the coding, each of the pictures is coded for each access unit in a format determined in the determining of a unit of coding and in the determining of a field type.

2 Claims, 20 Drawing Sheets

(56) References Cited

U.S. PATENT DOCUMENTS

| | | |
|---|---|---|
| 2003/0214502 A1 | 11/2003 | Park et al. |
| 2003/0218606 A1 | 11/2003 | Zhirkov et al. |
| 2004/0027452 A1 | 2/2004 | Yun et al. |
| 2004/0120396 A1 | 6/2004 | Yun et al. |
| 2004/0151251 A1 | 8/2004 | Song |
| 2004/0223551 A1 | 11/2004 | Hannuksela |
| 2005/0002646 A1 | 1/2005 | Sato |
| 2006/0013297 A1 | 1/2006 | Suzuki et al. |
| 2006/0132610 A1 | 6/2006 | Xin et al. |
| 2008/0089428 A1 | 4/2008 | Nakamura et al. |
| 2008/0117988 A1 | 5/2008 | Toma et al. |
| 2008/0131079 A1 | 6/2008 | Toma et al. |
| 2008/0152241 A1 | 6/2008 | Itoi et al. |
| 2008/0219351 A1 | 9/2008 | Kim |
| 2008/0219393 A1 | 9/2008 | Toma et al. |
| 2009/0185616 A1* | 7/2009 | Pandit et al. ............. 375/240.01 |
| 2009/0207904 A1 | 8/2009 | Pandit et al. |
| 2009/0225826 A1 | 9/2009 | Pandit et al. |
| 2010/0034293 A1 | 2/2010 | Lin et al. |

FOREIGN PATENT DOCUMENTS

| | | |
|---|---|---|
| EP | 1 628 485 A2 | 2/2006 |
| JP | 2005-510187 | 4/2005 |
| JP | 2006-054500 | 2/2006 |
| JP | 2006-101323 | 4/2006 |
| JP | 2007-325289 | 12/2007 |
| JP | 2008-22549 | 1/2008 |
| JP | 2009-4941 | 1/2009 |
| KR | 10-2004-0013540 | 2/2004 |
| RU | 2 237 283 | 9/2004 |
| RU | 2005 129 107 | 3/2006 |
| WO | 2004/075555 | 9/2004 |
| WO | 2007/081178 | 7/2007 |
| WO | 2007/114608 | 10/2007 |
| WO | 2007/126508 | 11/2007 |
| WO | 2007/126511 | 11/2007 |
| WO | 2008/130500 | 10/2008 |

OTHER PUBLICATIONS

Written Opinion of the International Searching Authority issued Mar. 2, 2010 in corresponding International Application PCT/JP2010/000261 (with English translation).

E. Francois et al., Restrictions on Interlaced Coding in SVC, JVT-W025, Apr. 2007, JVT-W025r1.doc, p. 1-2.

H. 264_MPEG-4 AVC Multiview Video Coding (MVC) Standard, pp. 305-323 (Chapter 13), Jan. 2009, (with English translation).

Decision on Grant issued Aug. 2, 2011 for corresponding Russian Application No. 2011105122.

Notice of Acceptance mailed Aug. 28, 2012 in corresponding Australian Application No. 2011250757.

Notice of Acceptance mailed Mar. 21, 2012 in corresponding Australian Application No. 2011250758.

Decision on Grant, with English translation, mailed Oct. 3, 2012 in corresponding Russian Patent Application No. 2010129246.

Anthony Vetro, "Joint Draft 8.0 on Multiview Video Coding", Joint Video Team (JVT) of ISO/IEC MPEG & ITU-T VCEG, JVT-AB204, 28th Meeting: Hannover, Jul. 20-25, 2008.

* cited by examiner

FIG. 1A

Row number

0: ⊠ ⊠ ⊠ ⊠ ⊠ ⊠ ⋯

1: ⊠ ⊠ ⊠ ⊠ ⊠ ⊠

2: ⊠ ⊠ ⊠ ⊠ ⊠ ⊠

3: ⊠ ⊠ ⊠ ⊠ ⊠ ⊠

4: ⊠ ⊠ ⊠ ⊠ ⊠ ⊠

⋮ ⋮ ⋰

⊠ Represent sampling locations of luma pixels

FIG. 1B

Row number — Top field

0: ⊠ ⊠ ⊠ ⊠ ⊠ ⊠ ⋯     Bottom field

1:                    ⊠ ⊠ ⊠ ⊠ ⊠ ⊠ ⋯

2: ⊠ ⊠ ⊠ ⊠ ⊠ ⊠

3:                    ⊠ ⊠ ⊠ ⊠ ⊠ ⊠

4: ⊠ ⊠ ⊠ ⊠ ⊠ ⊠

⋮ ⋮ ⋰    ⊠ ⊠ ⊠ ⊠ ⊠ ⊠

⋮ ⋰

⊠ Represent sampling locations of luma pixels

CODING METHOD, DECODING METHOD, CODING APPARATUS, DECODING APPARATUS, PROGRAM, AND INTEGRATED CIRCUIT

CROSS REFERENCE TO RELATED APPLICATIONS

This application is a continuation of application Ser. No. 12/792,899, filed on Jun. 3, 2010, which is a continuation application of PCT application No. PCT/JP2010/000261 filed on Jan. 19, 2010, designating the United States of America.

BACKGROUND OF THE INVENTION (1) Field of the Invention

The present invention can be used as any method of coding and decoding multimedia data and, more particularly, as a method of coding and decoding H.264/MPEG-4 AVC Multiview Video.

(2) Description of the Related Art 3D video has been around for a long time. There are several methods of producing the visual effects of 3D to a viewer. One of the methods is to present two sets of moving pictures separately to the viewer's left and right eyes. This is called stereoscopic imaging which involves the capturing of the two sets of moving pictures using two cameras. One of the techniques used previously to present stereoscopic video is using the filtering of the color components where each eye can only view. Such techniques reduce the resolution of a picture that reaches each eye.

Recently, with the advancement in display technologies, viewers are now able to view full resolution videos with each eye. The video standard H.264/MPEG-4 AVC Multiview Video Coding (MVC) is designed for the compression of such 3D imaging where each view is presented in the full resolution.

The video standard H.264/MPEG-4 AVC Multiview Video Coding (MVC) provides a set of compression tools which allow the efficient compression of moving pictures targeted for more than one set of views. The video standard MVC allows the compression of pictures using predictive coding from reconstructed pictures of a different set of views. This "inter-view" prediction utilizes the correlation of pictures captured by different cameras at approximately the same time to efficiently compress the pictures.

In the video standard MVC, the "inter-view" prediction is performed only on pictures of different views having the same picture order count information. The picture order count information is used to indicate the order of reconstructed pictures of the same view. In the video standard MVC, pictures (or view components as defined in the MVC standard) of different views having the same picture order count information are grouped together as a container called an access unit where the size of these access units are constrained by limits defined by a buffer model specified in the video standard. Such constraints are necessary to ensure correct decoding of the compressed video. A view component as defined in the MVC standard as well as in DESCRIPTION is a coded representation of a view in a single access unit. One example of a view is a picture.

The H.264/MPEG-4 AVC High Profile is widely used in various applications, such as High Definition Storage Media and High Definition Digital Video Broadcasting. The Multiview High Profile defined in the video standard MVC is designed as an extension of the H.264/MPEG-4 AVC High Profile where existing implementation of H.264/MPEG-4 AVC High Profile decoders can be easily modified to support the decoding of compressed video streams using the Multiview High Profile. In some implementation of the MVC standard, the decoding of each view can be achieved independently by using the implemented H.264/MPEG-4 AVC decoders.

Video content can be captured by a progressive scan or interlaced scan camera. In the case when the video is captured using the interlaced scan camera, the H.264/MPEG-4 AVC High Profile provides a set of coding tools targeted specifically to handle interlaced scan captured moving pictures. Each picture can be coded as a frame or fields as shown in FIGS. 1A and 1B. FIG. 1A shows pixel sampling locations of a frame picture including two of the interlaced scanned fields. FIG. 1B shows pixel sampling locations of field pictures where each interlaced scanned field is coded as a field picture. In the case when the two complementary fields are coded as a frame as shown in FIG. 1A, the frame has two picture order counts to present the order of each field.

One problem with the prior art (Multiview Video Coding Standard) is that the definition of the container, or access unit, when each of the pictures (or view components as defined in the MVC standard) of different views is coded differently either using frame coding or field coding. FIG. 2 shows an example of access units with different picture coding structures for each view. As shown in FIG. 2, an access unit container A as shown in a module 200 contains one frame picture of a view 2 and one field picture of a view 1 whereas an access unit container B as shown in a module 202 contains only one field picture of the view 1. This reduces the compression efficiency because the frame picture of the view 2 in the access unit A cannot fully utilize the inter-view prediction from the view 1.

The problem is that each access unit container does not always contain all the pictures (or view components) of different views. Thus, it is not possible to constrain the size of each access unit by the limits defined by a buffer model specified in the video standard to ensure proper decoding of the compressed video.

The other problem with the prior art (Multiview Video Coding Standard) is the constraints set to restrict the size of the access unit container which contains pictures (or view components as defined in the MVC standard) of more than one views. Even though the maximum size of an access unit is restricted, the maximum size of each picture (or view components as defined in the MVC standard) of each view within the access unit container is not constrained. This will create problems for some implementation of the MVC decoder where each view is decoded by a separate H.264/MPEG-4 AVC decoder.

The constraints defined to restrict the maximum size of an access unit does not ensure the proper decoding of each view component within the access unit when each view is separately decoded by an independent decoder. Such constraints include the maximum number of slices and the size of each picture (or view component as defined in the MVC standard) within an access unit.

The present invention has been conceived in view of the circumstances, and has an object of providing (i) a coding method and (ii) a decoding method for improving the coding efficiency of a group of pictures having different views, and (iii) a coding apparatus, (iv) a decoding apparatus, (v) a program, and (vi) an integrated circuit for implementing the coding method and the decoding method.

SUMMARY OF THE INVENTION

The coding method according to an aspect of the present invention is a coding method of coding a first picture group and a second picture group that are interlaced and captured at different view points, and the coding method includes: defining an access unit including a picture of the first picture group and a picture of the second picture group that corresponds to the picture of the first picture group; and coding each of the pictures included in the access unit, the access unit being defined in the defining, wherein the defining includes: determining a unit of coding for determining whether the pictures included in the access unit are to be uniformly coded on a per-field basis or on a per-frame basis; and determining a field type for determining whether the pictures are to be uniformly coded as top fields or bottom fields, when it is determined in the determining of a unit of coding that the pictures included in the access unit are to be coded on a per-field basis, and in the coding, each of the pictures is coded for each access unit in a format determined in the determining of a unit of coding and in the determining of a field type.

According to the method, since the format (field/frame, top/bottom) of all the pictures included in the same access unit is unified, the coding efficiency is improved when the inter-view coding is performed.

Furthermore, in the determining of a unit of coding, a value indicating whether a picture is on a per-field basis or on a per-frame basis may be set to a reference field_pic_flag, in the determining of a field type, a value indicating whether the picture is a top field or a bottom field may be set to a reference bottom_field_flag, and in the coding: the picture of the first picture group and the picture of the second picture group that corresponds to the picture of the first picture group may be obtained based on the values set in the reference field_pic_flag and the reference bottom_field_flag; the value of the reference field_pic_flag may be set to a field_pic_flag included in a slice header of each of the obtained pictures; and the value of the reference bottom_field_flag may be set to a bottom_field_flag included in the slice header, when the value indicating that the picture is on a per-field basis is set to the reference field_pic_flag.

Furthermore, the coding may include: coding the picture of the first picture group, using a predictive picture generated from a picture of the first picture group; and coding the picture of the second picture group, using one of (i) a predictive picture generated from a picture of the second picture group and (ii) the predictive picture generated from the picture of the first picture group, within the access unit including the picture of the second picture group. Since the format of all the pictures included in the same access unit is unified, the coding efficiency is improved when the inter-view predictive coding is performed in coding of the picture of the second picture group.

The coding method may further include checking conformance of coding processes in the coding, wherein the checking may include: computing a maximum number of slices for each of the pictures included in the access unit; computing a maximum number of bytes for each of the pictures included in the access unit; and comparing the number of slices with a corresponding one of the maximum numbers of slices computed in the computing of a maximum number of slices, and the number of bytes with a corresponding one of the maximum numbers of bytes computed in the computing of a maximum number of bytes, and feeding back a result of the comparison to the coding, the number of slices and the number of bytes being obtained in the coding of each of the pictures. Thus, a bit stream that cannot be decoded can be prevented from being outputted.

Furthermore, in the coding, a quantization step may be increased or decreased based on the result of the comparison fed back from the comparing. The increase and decrease in the quantization step enables adjustment of an amount of coded data.

The decoding method according to an aspect of the present invention is a decoding method of decoding a coded stream obtained by coding a first picture group and a second picture group for each access unit including a picture of the first picture group and a picture of the second picture group that corresponds to the picture of the first picture group, the first picture group and the second picture group being captured at different view points, and the decoding method includes: determining whether or not the picture of the first picture group is in synchronization with the picture of the second picture group, within the access unit; decoding the picture of the first picture group, using a predictive picture generated from a picture of the first picture group; and decoding the picture of the second picture group, using one of (i) a predictive picture generated from a picture of the second picture group and (ii) the predictive picture generated from the picture of the first picture group, within the access unit including the picture of the second picture group, in the decoding of the picture of the second picture group, when it is determined in the determining that the picture of the first picture group is not in synchronization with the picture of the second picture group, the picture included in the access unit and in the first picture group is outputted.

According to the method, since decoding processes are performed after checking the presence or absence of the synchronization, inter-view predictive decoding can be effectively prevented, for example, based on a predictive picture different from the original predictive picture.

Furthermore, a slice header of each of the pictures included in the access unit includes the field_pic_flag and the bottom_field_flag, and in the determining: a value of the field_pic_flag included in the slice header of the picture of the first picture group may match a value of the field_pic_flag included in the slice header of the picture of the second picture group; and when a value indicating that a picture is on a per-field basis is set to the field_pic_flag, in the case where a value of the bottom_field_flag included in the slice header of the picture of the first picture group matches a value of the bottom_field_flag included in the slice header of the picture of the second picture group, it may be determined that the picture of the first picture group is in synchronization with the picture of the second picture group.

Furthermore, the decoding may include: decoding the picture of the first picture group, using a predictive picture generated from a picture of the first picture group; and decoding the picture of the second picture group, using one of (i) a predictive picture generated from a picture of the second picture group and (ii) the predictive picture generated from the picture of the first picture group, within the access unit including the picture of the second picture group, in the decoding of the picture of the second picture group, when it is determined in the determining that the picture of the first picture group is not in synchronization with the picture of the second picture group, the picture included in the access unit and in the first picture group may be outputted.

When the pictures included in the access unit are in synchronization with each other, the inter-view predictive decoding cannot be executed. Thus, the decoding is abandoned, and the corresponding picture normally decoded is outputted. Thereby, although the pictures temporarily become two-dimensional pictures, the malfunction, such as a case where unnatural pictures are displayed, can be overcome.

The coding apparatus according to an aspect of the present invention is a coding apparatus that codes a first picture group and a second picture group that are interlaced and captured at different view points, and the coding apparatus includes: an access unit defining unit configured to define an access unit including a picture of the first picture group and a picture of the second picture group that corresponds to the picture of the first picture group; and a coding unit configured to code each of the pictures included in the access unit, the access unit being defined by the access unit defining unit, wherein the access unit defining unit includes: a unit-of-coding determining unit configured to determine whether the pictures included in the access unit are to be uniformly coded on a per-field basis or on a per-frame basis; and a field type determining unit configured to determine whether the pictures are to be uniformly coded as top fields or bottom fields, when the unit-of-coding determining unit determines that the pictures included in the access unit are to be coded on a per-field basis, and the coding unit is configured to code each of the pictures for each access unit in a format determined by the unit-of-coding determining unit and by the field type determining unit.

The decoding apparatus according to an aspect of the present invention is a decoding apparatus that decodes a coded stream obtained by coding a first picture group and a second picture group for each access unit including a picture of the first picture group and a picture of the second picture group that corresponds to the picture of the first picture group, the first picture group and the second picture group being captured at different view points, and the decoding apparatus includes: a determination unit configured to determine whether or not the picture of the first picture group is in synchronization with the picture of the second picture group, within the access unit; and a decoding unit configured to perform different decoding processes depending on whether or not the determination unit determines that the picture of the first picture group is in synchronization with the picture of the second picture group.

The program according to an aspect of the present invention is a program causing a computer to code a first picture group and a second picture group that are interlaced and captured at different view points, and the program includes: defining an access unit including a picture of the first picture group and a picture of the second picture group that corresponds to the picture of the first picture group; and coding each of the pictures included in the access unit, the access unit being defined in the defining, wherein the defining includes: determining a unit of coding for determining whether the pictures included in the access unit are to be uniformly coded on a per-field basis or on a per-frame basis; and determining a field type for determining whether the pictures are to be uniformly coded as top fields or bottom fields, when it is determined in the determining of a unit of coding that the pictures included in the access unit are to be coded on a per-field basis, and in the coding, each of the pictures is coded for each access unit in a format determined in the determining of a unit of coding and in the determining of a field type.

The program according to another aspect of the present invention is a program causing a computer to decode a coded stream obtained by coding a first picture group and a second picture group for each access unit including a picture of the first picture group and a picture of the second picture group that corresponds to the picture of the first picture group, the first picture group and the second picture group being captured at different view points, and the program includes: determining whether or not the picture of the first picture group is in synchronization with the picture of the second picture group, within the access unit; and performing different decoding processes depending on whether or not the picture of the first picture group is in synchronization with the picture of the second picture group in the determining.

The integrated circuit according to an aspect of the present invention is an integrated circuit that codes a first picture group and a second picture group that are interlaced and captured at different view points, and the integrated circuit includes: an access unit defining unit configured to define an access unit including a picture of the first picture group and a picture of the second picture group that corresponds to the picture of the first picture group; and a coding unit configured to code each of the pictures included in the access unit, the access unit being defined by the access unit defining unit, wherein the access unit defining unit includes: a unit-of-coding determining unit configured to determine whether the pictures included in the access unit are to be uniformly coded on a per-field basis or on a per-frame basis; and a field type determining unit configured to determine whether the pictures are to be uniformly coded as top fields or bottom fields, when the unit-of-coding determining unit determines that the pictures included in the access unit are to be coded on a per-field basis, and the coding unit is configured to code each of the pictures for each access unit in a format determined by the unit-of-coding determining unit and by the field type determining unit.

The integrated circuit according to another aspect of the present invention is an integrated circuit that decodes a coded stream obtained by coding a first picture group and a second picture group for each access unit including a picture of the first picture group and a picture of the second picture group that corresponds to the picture of the first picture group, the first picture group and the second picture group being captured at different view points, the integrated circuit includes: a determination unit configured to determine whether or not the picture of the first picture group is in synchronization with the picture of the second picture group, within the access unit; and a decoding unit configured to perform different decoding processes depending on whether or not the determination unit determines that the picture of the first picture group is in synchronization with the picture of the second picture group.

According to the described coding method, since the format (field/frame, top/bottom) of all the pictures included in the same access unit is unified, the coding efficiency is improved when the inter-view coding is performed.

Further Information about Technical Background to This Application

The disclosure of Japanese Patent Application No. 2009-009391 filed on Jan. 19, 2009 including specification, drawings and claims is incorporated herein by reference in its entirety.

The disclosure of PCT application No. PCT/JP2010/000261 filed on Jan. 19, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1A shows an example of a frame picture;

FIG. 1B shows an example of a field picture;

DESCRIPTION OF THE PREFERRED EMBODIMENTS

To solve the above problems, a new method is introduced to constrain the picture coding structure (frame/field picture coding) and the data size of each picture (or each view component as defined in the MVC standard) within an access unit. What is novel about the present invention is that the present invention ensures that successful decoding of a video stream compressed using the MVC standard by implementation where each view is separately decoded using existing H.264/MPEG-4 AVC decoders. This new invention will force certain constraints on the data size and on the values of certain syntaxes of each picture (or each view component as defined in the MVC standard) within an access unit.

The advantage of the present invention is to implement lower-cost encoder and decoder of the MVC standard. The present invention also helps to improve coding efficiency since it allows "inter-view" prediction to be used between field pictures of each view.

The present invention includes two main processes, that is, a coding process for the view components of an access unit and a decoding process for the view components of an access unit. The present invention restricts the values of syntaxes field_pic_flag and bottom_field_flag found in the slice headers as shown in FIG. 3 to be the same among all the view components within the same access unit to solve the problems as described above.

Figure 2:
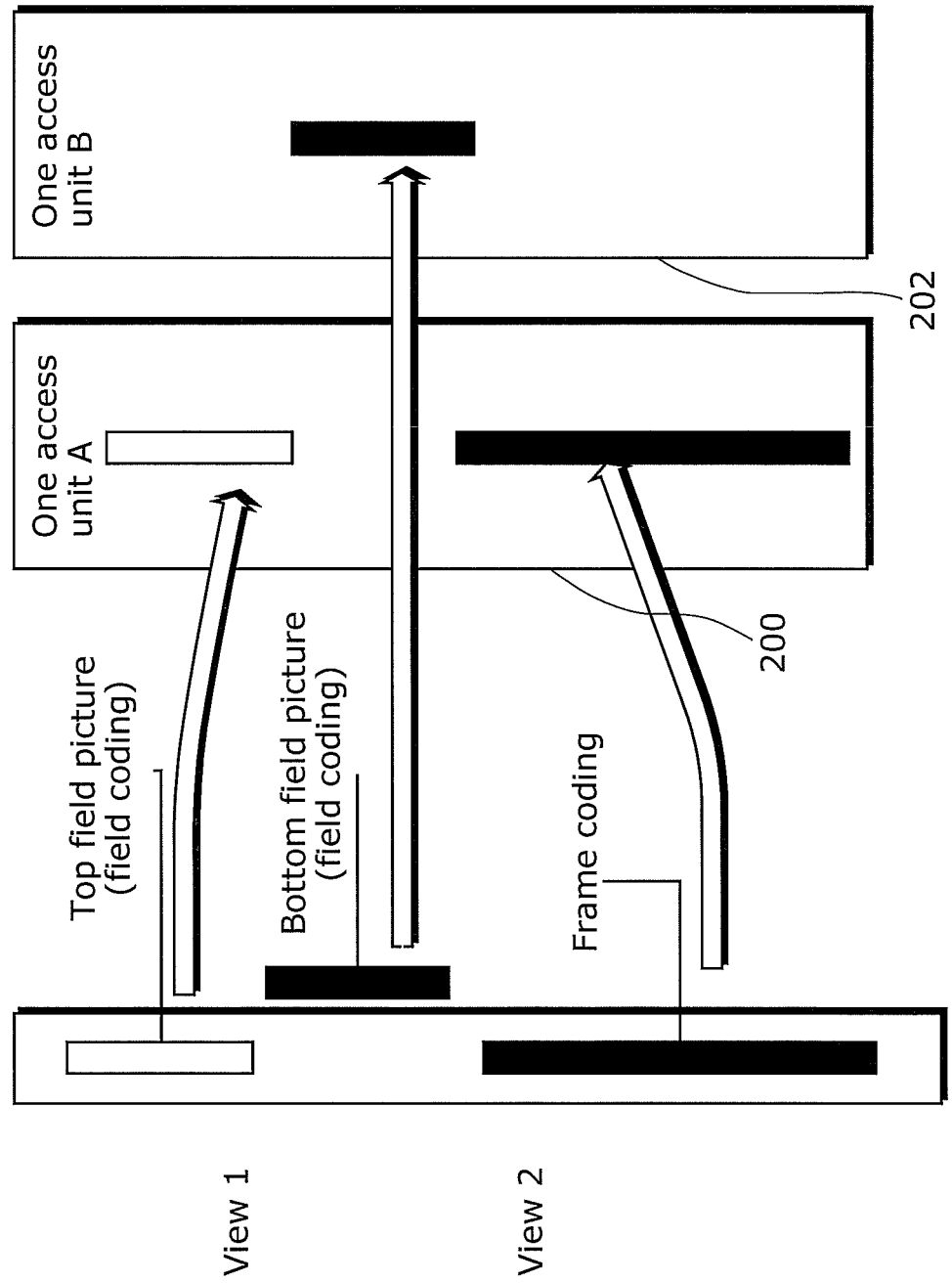
FIG. 2 shows an example of access units with different picture coding structures for each view.
Figure 3:
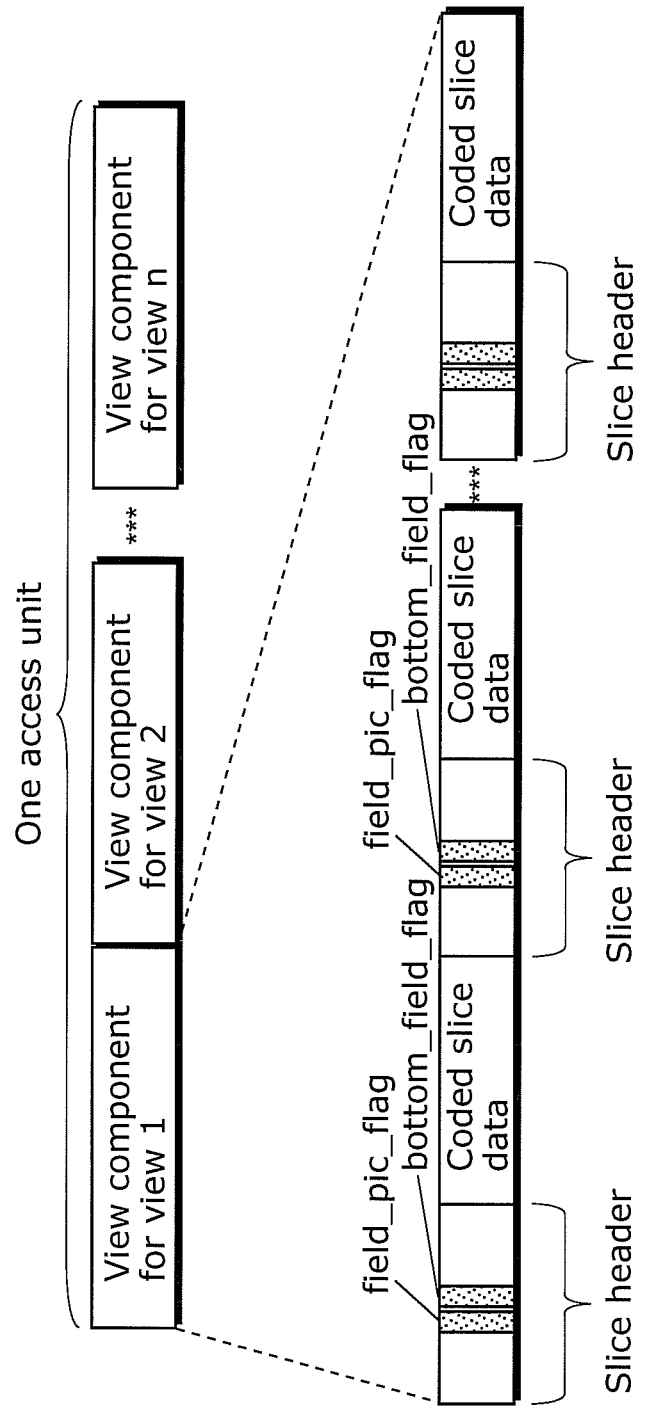
FIG. 3 shows a data structure of an access unit.

The field_pic_flag in FIG. 3 is used to determine whether a slice associated with a view component is coded as a field or a frame. For example, a value "1" for the field_pic_flag indicates that the slice belongs to a view component that is coded as a field, and that a value "0" indicates that the slice belongs to a view component that is coded as a frame.

The bottom_field_flag in FIG. 3 is used to determine whether the slice associated with the view component that is coded as a field is a top field or a bottom field. The presence of the bottom_field_flag in a slice header depends on the value of the field_pic_flag. For example, a value "1" for the bottom_field_flag indicates that a slice that belongs to a view component that is coded as a field is a bottom field, while a value "0" for the bottom_field_flag indicates the slice that belongs to a view component that is coded as a field is a top field. However, when "0" is set to the value of the field_pic_flag in a slice header provided from a coding apparatus, the bottom_field_flag of the slice header is omitted.

The present invention also restricts the total number of slices and total number of bytes of each view component within an access unit.

Embodiment 1

Figure 4:
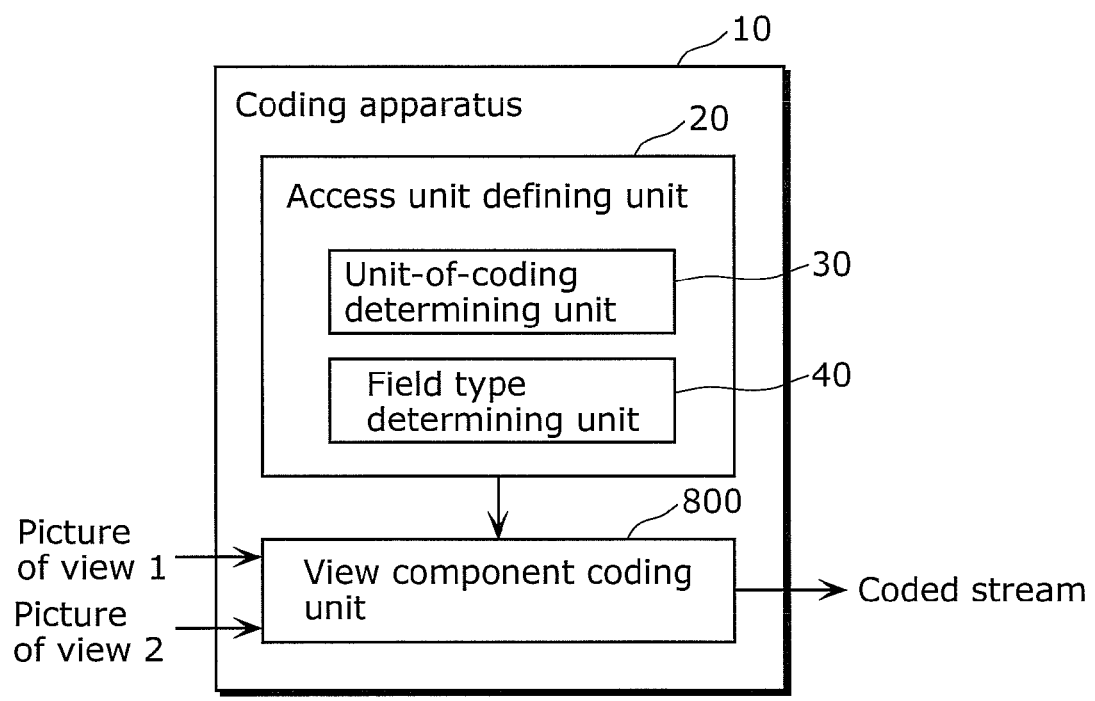
FIG. 4 is a functional block diagram illustrating a coding apparatus according to Embodiment 1 of the present invention.

FIG. 4 is a functional block diagram illustrating a coding apparatus 10 according to Embodiment 1 of the present invention. The coding apparatus 10 is an apparatus that codes a picture of the view 1 and a picture of the view 2, and includes an access unit defining unit 20 and a view component coding unit 800. The picture of the view 1 is one of interlaced moving pictures (first picture group) obtained by capturing an object from the view 1. The picture of the view 2 is one of interlaced moving pictures (second picture group) obtained by capturing the same object from the view 2 that is different from the view 1.

The access unit defining unit 20 includes a unit-of-coding determining unit 30 and a field type determining unit 40, and defines an access unit including the picture of the view 1 and the picture of the view 2 that corresponds to the picture of the view 1. The corresponding pictures herein indicate pictures which have been captured at the same time of day and to which the same Presentation Time Stamp (PTS) is added. Alternatively, the corresponding pictures are added with the same picture order count.

The unit-of-coding determining unit 30 determines whether the pictures included in an access unit are to be uniformly coded on a per-field basis or on a per-frame basis. More specifically, when the pictures included in an access unit are to be uniformly coded on a per-frame basis, the unit-of-coding determining unit 30 sets "0" to a reference field_pic_flag that is an internal variable. In contrast, when the pictures included in an access unit are to be uniformly coded on a per-field basis, the unit-of-coding determining unit 30 sets "1" to the reference field_pic_flag.

When it is determined that the pictures included in an access unit are to be coded on a per-field basis, the unit-of-coding determining unit 40 determines whether the pictures are to be uniformly coded as top fields or bottom fields. More specifically, the unit-of-coding determining unit 40 sets "0" to a reference bottom_field_flag that is an internal variable, when it is determined that the pictures included in an access unit are to be uniformly coded as top fields. In contrast, when it is determined that the pictures included in an access unit are to be uniformly coded as bottom fields, the unit-of-coding determining unit 30 sets "1" to the reference bottom_field_flag. Here, the processing is performed only when "1" is set to the reference field_pic_flag. When "0" is set to the reference field_pic_flag, "0" is automatically set to the reference bottom_field_flag.

The view component coding unit 800 codes each of the pictures in the format determined by the unit-of-coding determining unit 30 and the field type determining unit 40, for each access unit defined by the access unit defining unit 20.

Figure 5:
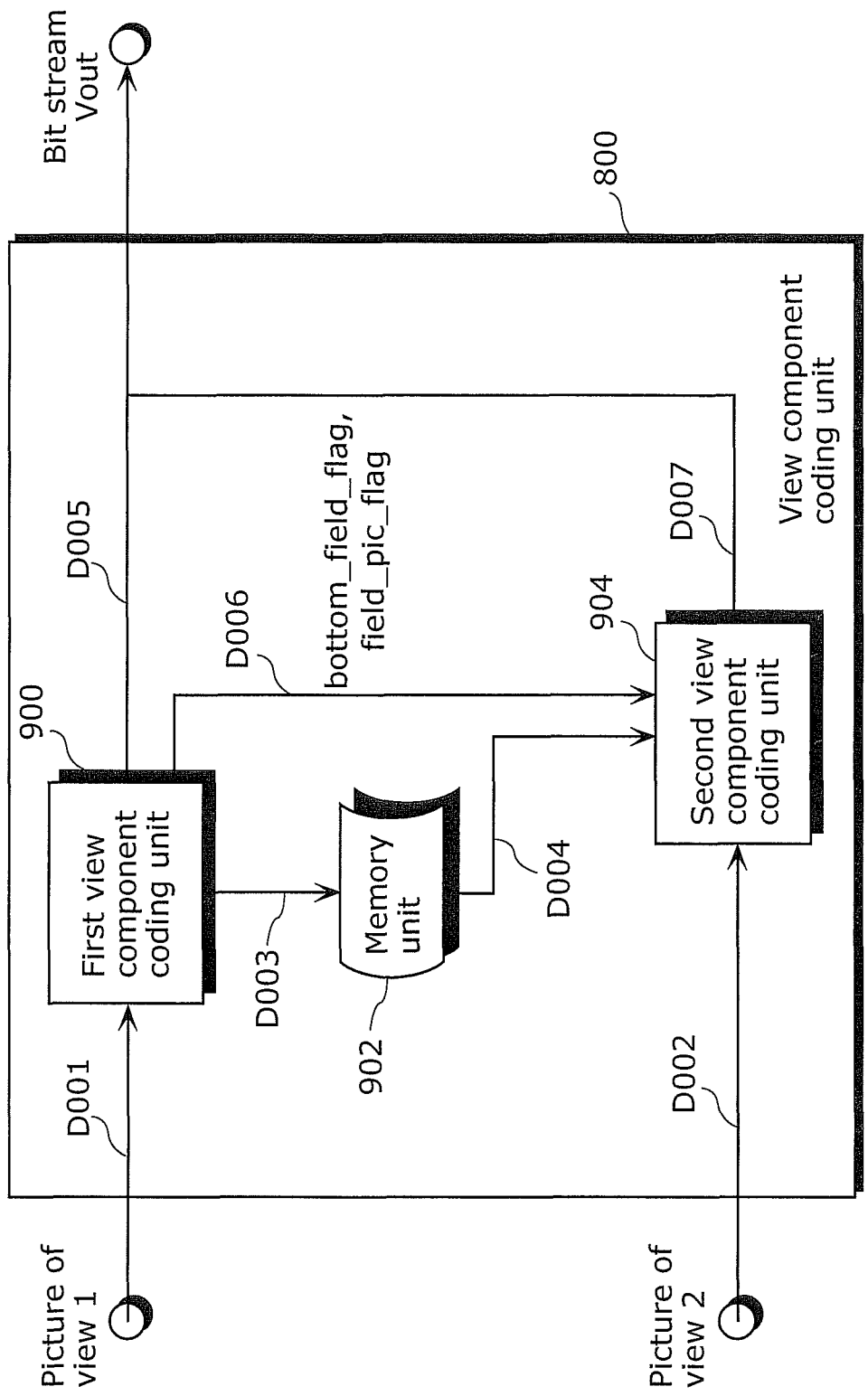
FIG. 5 is a functional block diagram illustrating a view component coding unit.

FIG. 5 is a functional block diagram illustrating the view component coding unit 800. The view component coding unit 800 includes a first view component coding unit 900, a second view component coding unit 904, and a memory unit 902. As a variation of the view component coding unit 800, the first view component coding unit 900 and the second view component coding unit 904 may be combined.

The first view component coding unit 900 reads a picture D001 from the view 1. The first view component coding unit 900 determines that the format of the read picture D001 is on a per-field basis or on a per-frame basis, and in the case of on a per-field basis, determines whether the read picture D001 is a top field or a bottom field, based on a result of the determination by the unit-of-coding determining unit 30 and the field type determining unit 40.

Next, the first view component coding unit 900 codes the read picture D001 per slice. For example, the first view component coding unit 900 subtracts a predictive picture of the picture D001 from the picture D001, and performs orthogonal transformation (DCT transform) on, quantizes, and entropy codes the resulting picture to provide Vout with a coded view component D005 of the view 1. The predictive picture of the picture D001 is generated (intra picture prediction or inter picture prediction) using a coded picture of the view 1. In other words, the view 1 according to Embodiment 1 is a "base view" independent of other views (view 2 in this example).

Furthermore, the first view component coding unit 900 inverse quantizes the quantized coefficient, performs inverse orthogonal transformation on the inverse quantized coefficient, and provides the memory unit 902 with a reconstructed picture D003 obtained by adding the predictive picture to the resulting coefficient. Furthermore, the first view component coding unit 900 provides the second view component coding unit 904 with the value of the bottom_field_flag and the value of field_pic_flag used for coding the coded view component D005.

The second view component coding unit 904 reads a picture D002 from the view 2, within the same access unit including the picture D001 of the view 1. The second view component coding unit 904 determines whether the format of the read picture D002 is on a per-field basis or on a per-frame basis, and in the case of on a per-field basis, further determines whether the read picture D002 is a top field or a bottom field, based on the value of the bottom_field_flag and the value of field_pic_flag obtained from the first view component coding unit 900. In other words, the picture D001 and the picture D002 are of the same format.

Next, the second view component coding unit 904 codes the read picture D002 per slice, and provides a coded view component D007 to Vout. Although the specific coding processes are the same as the ones by the first view component coding unit 900, the second view component coding unit 904 differs from the first view component coding unit 900 in that the second view component coding unit 904 may generate (intra picture prediction or inter picture prediction) a predictive picture of the picture D002 using a coded picture of the view 2 and may generate (inter-view prediction) a predictive picture of the picture D002 using a picture from the view 1 within the same access unit (that is, the reconstructed picture D003 of the picture D001).

Figure 6:
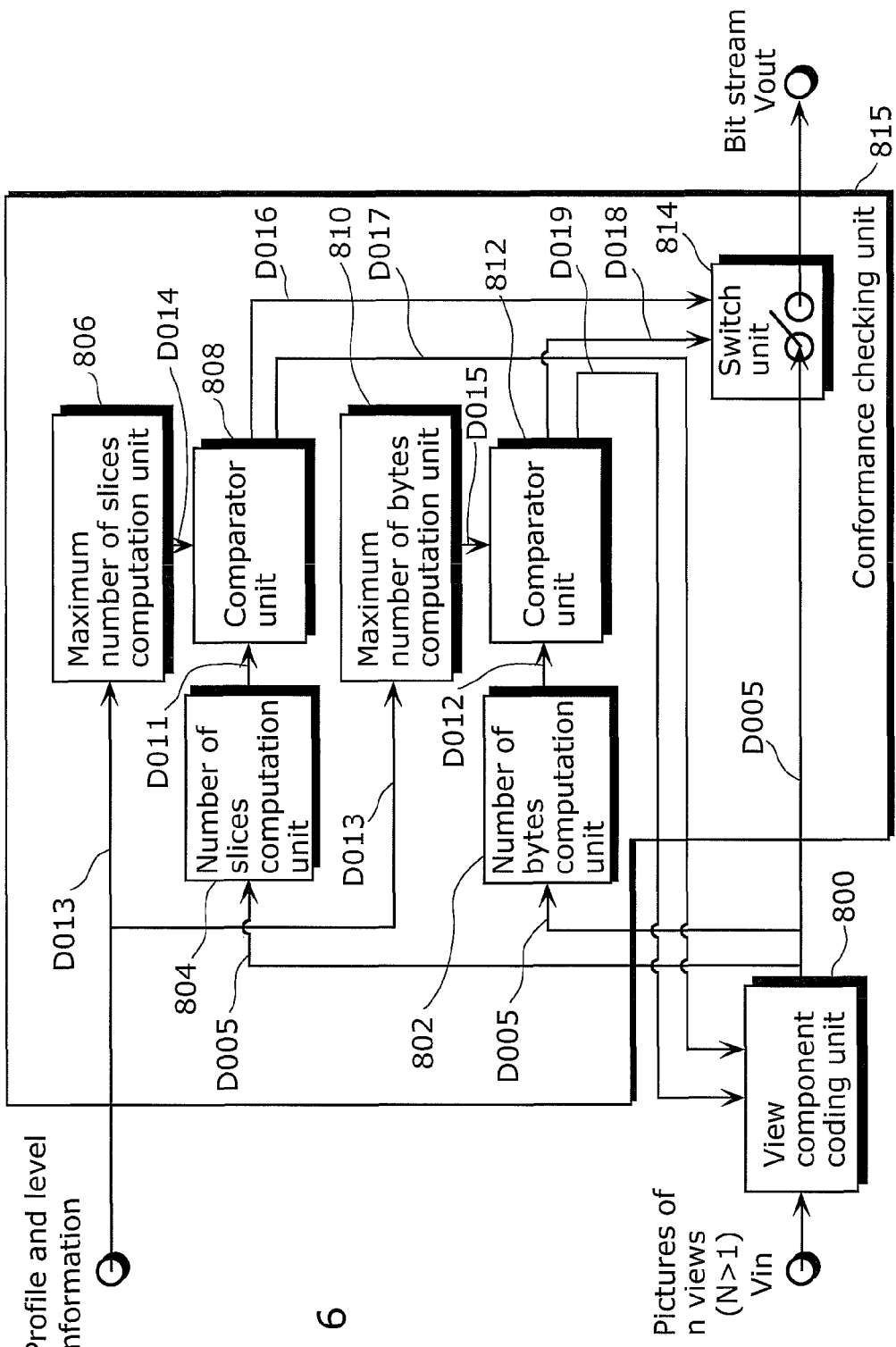
FIG. 6 is a functional block diagram illustrating a conformance checking unit.

Furthermore, the coding apparatus 10 according to Embodiment 1 may further include a conformance checking unit 815. FIG. 6 is a functional block diagram illustrating the conformance checking unit 815. The conformance checking unit 815 includes a number of slices computation unit 804, a number of bytes computation unit 802, a maximum number of slices computation unit 806, comparator units 808 and 812, a maximum number of bytes computation unit 810, and a switch unit 814. The conformance checking unit 815 parses a result of the coding processes executed by the view component coding unit 800, and feeds back a result of the parsing to the view component coding unit 800.

First, the view component coding unit 800 provides the coded view component D005 of the view 1 to the number of slices computation unit 804, the number of bytes computation unit 802, and the switch unit 814. Since the processing on the coded view component D007 of the view 2 is the same as that of the coded view component D005, the processing on the coded view component D005 of the view 1 will be mainly described hereinafter.

The number of slices computation unit 804 outputs a total number of slices D011 within the obtained coded view component D005 to the comparator unit 808. The number of bytes computation unit 802 outputs a total number of bytes D012 within the obtained coded view component D005 to the comparator unit 812.

The maximum number of slices computation unit 806 outputs a maximum number of slices D014 per view component to the comparator unit 808, based on obtained profile and level information D013. Although the method of determining the maximum number of slices D014 per view component is not in particular limited, for example, the maximum number of slices of a picture of the view 1 that is the "base view" may be relatively increased, whereas the maximum number of slices of a picture of the view 2 that is a "dependent view" may be relatively decreased.

The maximum number of bytes computation unit 810 outputs a maximum number of bytes D015 per view component to the comparator unit 808, based on the obtained profile and level information D013. Although the method of determining the maximum number of bytes D015 per view component is not in particular limited, for example, the maximum number of bytes of a picture of the view 1 that is the "base view" may be relatively increased, whereas the maximum number of bytes of a picture of the view 2 that is the "dependent view" may be relatively decreased.

The comparator unit 808 compares the total number of slices D011 with the maximum number of slices D014. Then, when the total number of slices D011 is not larger than the maximum number of slices D014, the comparator unit 808 determines that the coding processes conform to a predetermined condition and outputs an enabled signal D016 to the switch unit 814. In contrast, when the total number of slices D011 is larger than the maximum number of slices D014, the comparator unit 808 determines that the coding processes do not conform to the predetermined condition and outputs a control signal D017 to the view component coding unit 800.

The comparator unit 812 compares the total number of bytes D012 with the maximum number of bytes D015. Then, when the total number of bytes D012 is not larger than the maximum number of bytes D015, the comparator unit 808 determines that the coding processes conform to a predetermined condition and outputs an enabled signal D018 to the switch unit 814. In contrast, when the total number of bytes D012 is larger than the maximum number of bytes D015, the comparator unit 812 determines that the coding processes do not conform to the predetermined condition and outputs a control signal D019 to the view component coding unit 800.

The view component coding unit 800 re-codes the same input picture when it receives any one of the control signals D017 and D019. In the re-coding, for example, coding processes are performed using a quantization step larger than that used in the previous coding processes so as to conform to the predetermined condition.

The switch unit 814 will be enabled when it receives both the enable signals D016 and D018 from the comparator units 808 and 812, and outputs the coded view component D005 to Vout. When receiving neither the enable signals D016 nor D018, the switch unit 814 does not output the coded view component D005 to Vout.

The view component coding unit 800 may output the coded view component D005 per picture when the picture D001 is entirely coded. However, when the picture D001 is entirely coded and then it is determined that the coding processes do not conform to the predetermined condition, there emerges a need for re-coding the picture D001 under different conditions (such as changing a quantization step) and the processing load of the view component coding unit 800 increases.

Thus, the view component coding unit 800 may output the coded view component D005 on a per-slice unit basis when each slice included in the picture D001 is coded. Furthermore, the number of bytes computation unit 802 may sequentially output, to the comparator unit 812, the total number of bytes D012 of the coded view component D005 that has been coded up to the point in time.

In this case, the comparator unit 812 can predict a possibility that the total number of bytes D012 exceeds the maximum number of bytes D015 in advance, and transmit the control signal D019 to the view component coding unit 800. Thereby, the view component coding unit 800 can conform the coding processes to the predetermined condition based on the control signal D019, for example, by increasing the quantization step during when the picture D001 is coded.

Figure 7:
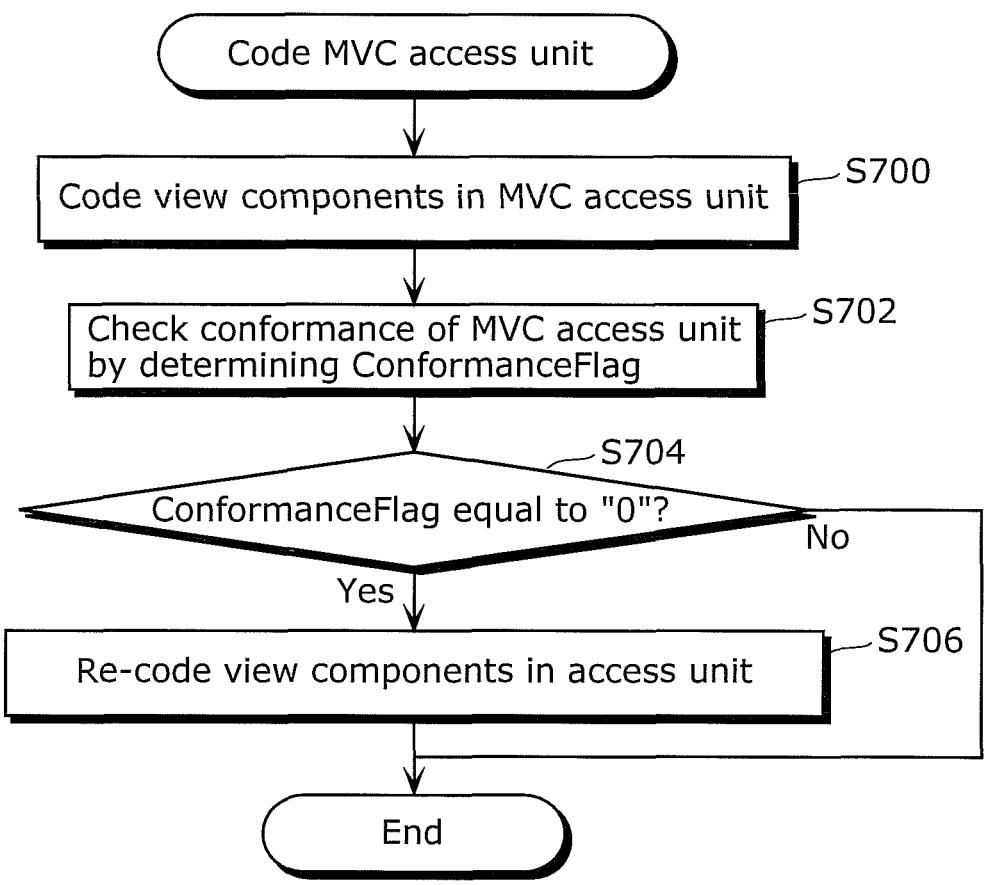
FIG. 7 shows a flowchart of the overall processes to code an MVC access unit.

FIG. 7 shows the flowchart of the overall processes to code an access unit using the MVC standard. As shown in FIG. 7, the view component coding unit 800 first codes all the view components in the access unit (S700). Next, the conformance checking unit 815 checks the conformance of the access unit by determining a value of a parameter ConformanceFlag (S702). The parameter ConformanceFlag is used to indicate whether the total number of slices in every view component and the total number of bytes in every access unit are not larger than the maximum values allowed for the normal decoding of the view components in the access unit by a typical decoder of the MVC standard.

When the parameter ConformanceFlag is equal to a value of "0" (that is, the coding processes do not conform to the predetermined condition) (Yes in S704), the conformance checking unit 815 causes the view component coding unit 800 to re-code the view components in the access unit and reduces either the total number of slices or the total number of bytes within a view component so as to ensure that the total number of slices in every view component and the total number of bytes in every access unit are not larger than the maximum values allowed for the normal decoding of the view components in the access unit by a typical decoder of the MVC standard (S706).

In S706, other processing can be executed instead of the re-coding process of the view components. For example, the view components may be replaced with coded view components that have been appropriately coded (that is, view components each having the parameter ConformanceFlag indicating "1").

More specifically, when the ConformanceFlag of a view component of the "base view" indicates "0", the view component coding unit 800 may output a coded view component among other view components of the "base view". The coded view component to be selected in that case is desired to be immediately before the view component that has not been successfully coded (out of conformance). In contrast, when the ConformanceFlag of a view component of the "dependent view" indicates "0", the view component coding unit 800 may output a coded view component of the "base view" within the same access unit.

The processes (S700, S702, S704 and S706) can also be applied to a single view component rather than an access unit. In the case of a single view component, the coding processes, the conformance checking processes, and the re-coding process are sequentially performed for each view component of an access unit.

Figure 8:
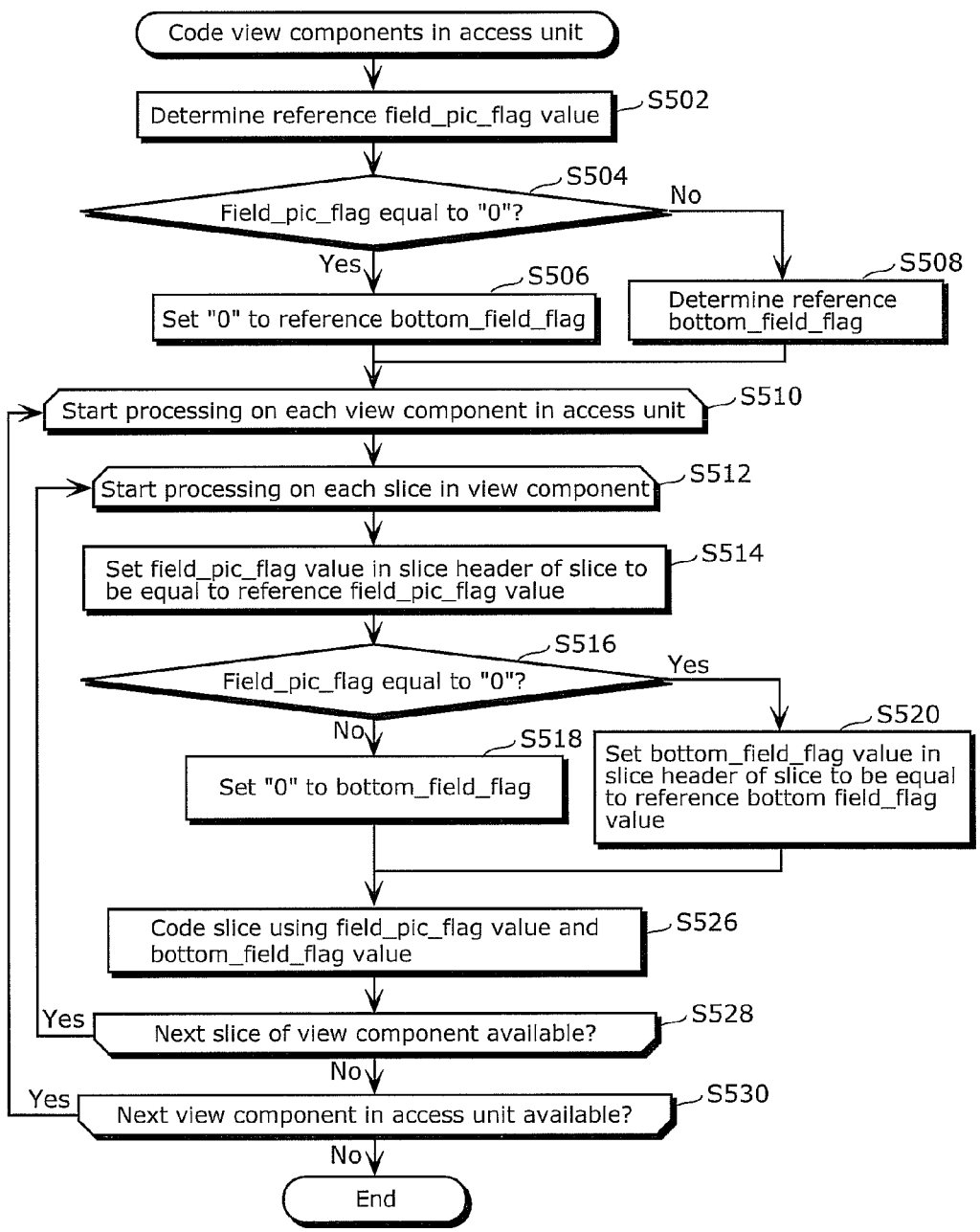
FIG. 8 shows a flowchart of coding processes on view components in an MVC access unit.

FIG. 8 shows a flowchart of coding processes on view components in an access unit. First, the unit-of-coding determining unit 30 determines a reference field_pic_flag value (S502). The method of determining the reference field_pic_flag is not in particular limited, and any conventional method can be used.

Next, the field type determining unit 40 compares the reference field_pic_flag value with a value "0" (S504). When the field_pic_flag is equal to the value "0" (Yes in S504), the field type determining unit 40 sets "0" to the reference bottom_field_flag (S506). When the field_pic_flag is not equal to the value "0" (No in S504), the field type determining unit 40 determines the value of the reference bottom_field_flag (S508). The method of determining the reference bottom_field_flag is not in particular limited, and any conventional method can be used.

The reference field_pic_flag will be used later to set all field_pic_flag values of slices within the same access unit. Furthermore, the reference bottom_field_flag will be used later to set all bottom_field_flag values of slices within the same access unit.

Next, the access unit defining unit 20 sets the field_pic_flag value in the slice header of every slice to be equal to the value of the reference field_pic_flag value, for all the slices (S512 to S528) in all the view components (S510 to S530) of the same access unit (S514).

Next, when the field_pic_flag value is equal to "1" (Yes in S516), the access unit defining unit 20 sets the bottom_field_flag value in the slice header of all of the slices within the same access unit to the reference bottom_field_flag value (S520). In contrast, when the field_pic_flag value is not equal to "1" (No in S516), the access unit defining unit 20 sets "0" to the bottom_field_flag value in the slice header of all of the slices within the same access unit (S518). Skipping S516 and S518, the access unit defining unit 20 may set the bottom_field_flag value in the slice header of all of the slices within the same access unit to the reference bottom_field_flag value.

Then, the view component coding unit 800 codes every slice within the same access unit based on the values of field_pic_flag and bottom_field_flag (S526). Since the detailed coding processes of the view component coding unit 800 are hereinbefore described with reference to FIG. 5, the description is omitted hereinafter.

Figure 9:
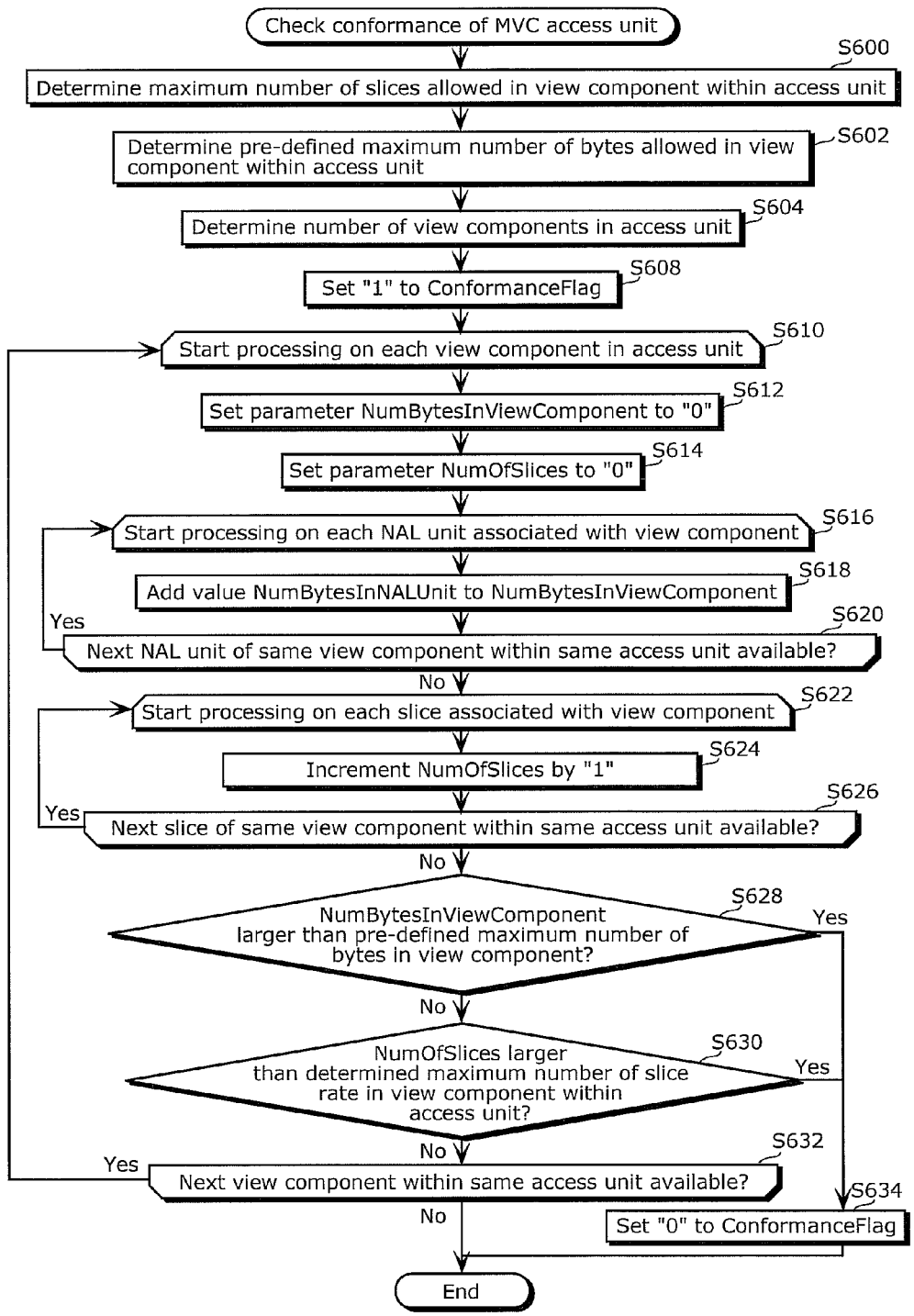
FIG. 9 shows a flowchart of processes for checking conformance of an MVC access unit.

FIG. 9 shows a flowchart of processes for checking conformance of an access unit. The processes can also be applied to check conformance of a view component within an access unit.

First, the maximum number of slices computation unit 806 determines the maximum number of slices D014 allowed in each view component within an access unit (S600). This maximum number of slices D014 allowed is computed based on the limits defined by the profile and level information D013 as indicated by syntax elements carried by the compressed stream associated with the access unit. An example of such syntax elements are profile_idc and level_idc syntaxes found in a sequence parameter set of an MVC coded stream.

Next, the maximum number of bytes computation unit 810 determines the maximum number of bytes D015 allowed in each view component within an access unit (S602). This maximum number of bytes D015 allowed is computed based on the limits defined by the profile and level information D013 as indicated by syntax elements carried by the coded video stream associated with the access unit.

Next, the conformance checking unit 815 determines the number of view components in an access unit (S604). Then, the conformance checking unit 815 sets "1" to a parameter ConformanceFlag (S608). This parameter ConformanceFlag is used to determine whether the view component in the access unit satisfies the requirements for the view component to be correctly decoded by a video decoder with associated profile and level values higher than the specified profile and level values in the coded video stream.

Next, the following processes are executed on each view component in an access unit (S610 to S632). First, the number of bytes computation unit 802 resets a parameter NumBytesInViewComponent to a value "0" (S612). Furthermore, the number of slices computation unit 804 resets a parameter NumOfSlices to a value "0" (S614).

The parameter NumBytesInViewComponent is a counter to count the total number of bytes D012 in a view component. The parameter NumOfSlices is a counter to count the total number of slices D011 in a view component.

Next, the following processes are executed on each NAL unit associated with the view component (S616 to S620). First, the number of bytes computation unit 802 adds the total number of bytes indicated by the parameter NumBytesInNALUnit to the parameter NumBytesInViewComponent (S618). In other words, the NumBytesInViewComponent parameter contains a value equivalent to a sum of the NumBytesInNALUnit parameters associated with the view component. A NAL unit is defined as a Network Abstraction Layer unit specified in the H.264/MPEG-4 AVC standard and contains the coded video data.

Next, the following processes are executed on each slice associated with the view component (S622 to S626). First, the number of slices computation unit 804 increments the parameter NumOfSlices by "1" (S624). In other words, the NumOfSlices parameter contains a value equivalent to the total number of slices associated with the same view component.

Next, the comparator units 808 and 812 compares the values of the parameters NumBytesInViewComponent and NumOfSlices with the maximum number of bytes D015 and the maximum number of slices D014 allowed in one view component, respectively (S628 and S630).

When the value of NumBytesInViewComponent is larger than the maximum number of bytes D015 allowed (Yes in S628), the comparator unit 812 sets "0" to the parameter ConformanceFlag (S634). Furthermore, when the value of NumOfSlices is larger than the maximum number slices D014 allowed (Yes in S630), the comparator unit 812 sets "0" to the parameter ConformanceFlag (S634).

The parameter ConformanceFlag with a value "0" indicates that the view component in the access unit may not be correctly decoded by a video decoder with associated profile and level values higher than the specified profile and level values in the coded video stream.

Figure 10:
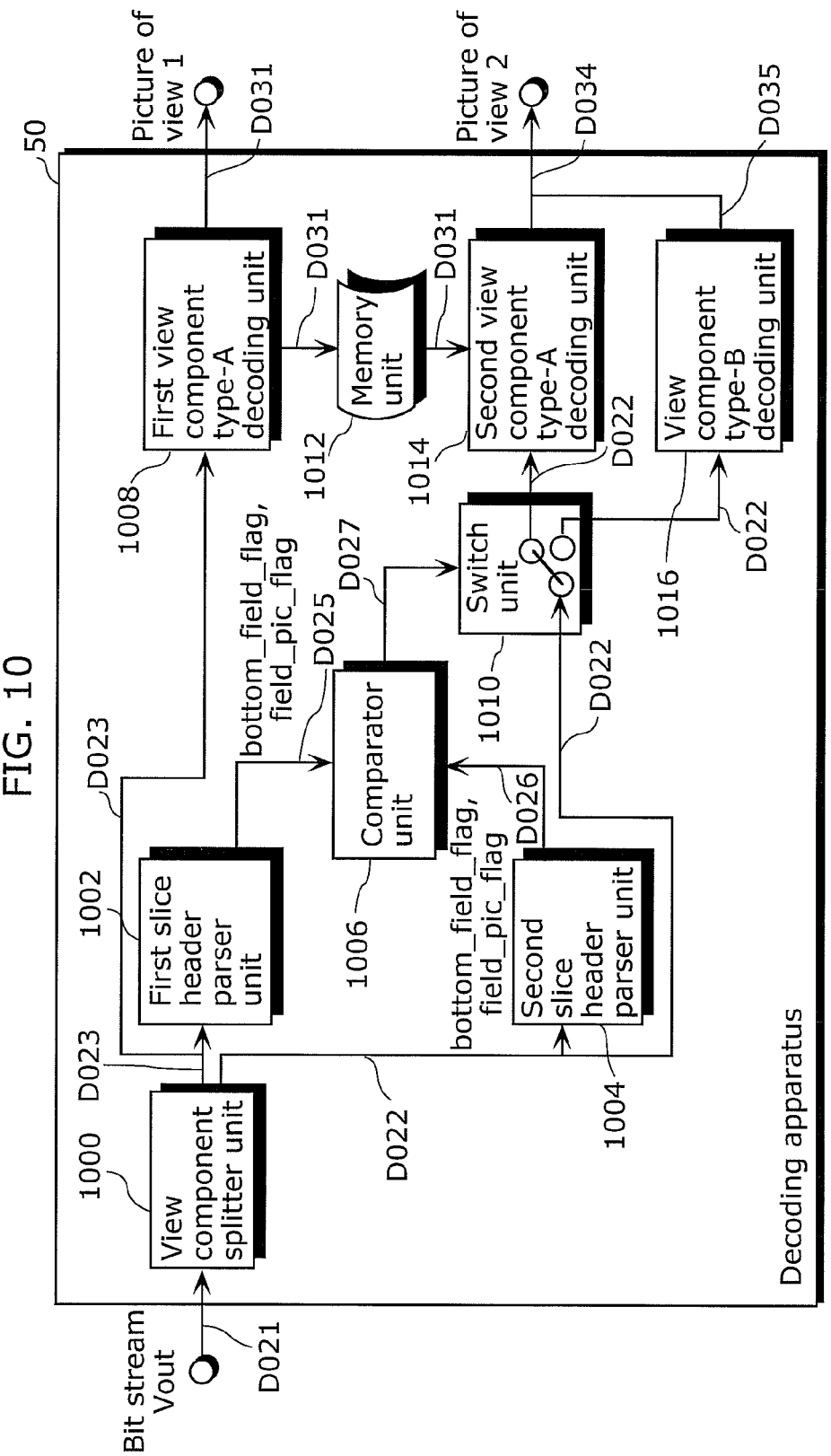
FIG. 10 is a functional block diagram illustrating a decoding apparatus according to Embodiment 1 in the present invention.

FIG. 10 is a functional block diagram illustrating a decoding apparatus 50 according to Embodiment 1 in the present invention. As illustrated in FIG. 10, the decoding apparatus 50 includes a view components splitter unit 1000, first and second slice header parser units 1002 and 1004, a comparator unit 1006, a switch unit 1010, first and second view component type-A decoding units 1008 and 1014, a view component type-B decoding unit 1016, and a memory unit 1012.

The view components splitter unit 1000 reads a coded access unit D021, and splits the coded access unit D021 into two of the first and second view components D023 and D022. The first view component D023 is a picture of the view 1 (base view) that does not depend on the second view component D022 for the correct reconstruction of the picture. In contrast, the second view component D022 is a picture of the view 2 (dependent view) that depends on the first view component D023 for the correct reconstruction of the picture.

A first slice header parser unit 1002 then reads the first view component D023 and outputs bottom_field_flag and field_pic_flag information D025 to the comparator unit 1006. The second slice header parser unit 1004 reads the second view component D022 and outputs bottom_field_flag and field_pic_flag information D026 to the comparator unit 1006.

The comparator unit 1006 compares values of (i) the bottom_field_flag and field_pic_flag information D025 from the first slice header parser unit 1002 and (ii) the bottom_field_flag and field_pic_flag information D026 from the second slice header parser unit 1004, and outputs a control signal D027 to the switch unit 1010.

The comparator unit 1006 functions as a determination unit that determines whether or not the first view component D023 of the view 1 is in synchronization with the second view component D022 of the view 2 within the same access unit. In other words, the comparator unit 1006 determines that both of the view components are in synchronization with each other when the values of bottom_field_flag and field_pic_flag of the first and second view components D023 and D022, respectively, match. On the other hand, when at least one of the values of bottom_field_flag and field_pic_flag of the first and second view components D023 and D022, respectively, do not match, the comparator unit 1006 determines that the view components are not in synchronization with each other.

The parameter that determines whether view components are in synchronization with each other is not limited to the one in the example above. For example, when Presentation Time Stamps (PTS) and Decoding Time Stamps (DTS) held respectively by the first and second view components D023 and D022 match, it may be determined that view components are in synchronization with each other. Otherwise, it may be determined that view components are not in synchronization with each other.

The first view component type-A decoding unit 1008 reads the first view component D023 and outputs a picture D031 of the view 1. The first view component type-A decoding unit 1008 also outputs the reconstructed picture of the view 1 D031 to the memory unit 1012. More specifically, the first view component type-A decoding unit 1008 entropy decodes, inverse quantizes, and performs inverse orthogonal transformation on the first view component D023, adds a predictive picture to the resultant, and outputs the reconstructed picture D031. Since the first view component D023 belongs to the "base view", the predictive picture is generated (intra picture prediction or inter picture prediction) using a decoded picture of the view 1.

The switch unit 1010 sends the second view component D022 to either the second view component type-A decoding unit 1014 or the view component type-B decoding unit 1016, based on the control signal D027 obtained from the comparator unit 1006. More specifically, when the first view component D023 is in synchronization with the second view component D022, the switch unit 1010 sends the second view component D022 to the second view component type-A decoding unit 1014. In contrast, when the first view component D023 is not in synchronization with the second view component D022, the switch unit 1010 sends the second view component D022 to the view component type-B decoding unit 1016.

Upon receipt of the second view component D022, the second view component type-A decoding unit 1014 decodes the second view component D022 using the reconstructed picture of the view 1D031 that is read from the memory unit 1012, and outputs a picture of the view 2 D034. Although the specific coding processes are the same as those of the first view component type-A decoding unit 1008, the second view component type-A decoding unit 1014 differs from the first view component type-A decoding unit 1008 in that the former may generate (intra picture prediction or inter picture prediction) a predictive picture using a decoded picture of the view 2, and generate (inter-view prediction) a predictive picture using a picture of the view 1 within the same access unit (that is, the reconstructed picture D031).

Upon receipt of the second view component D022, the view component type-B decoding unit 1016 outputs a picture of the view 2 D035. Since the view component type-B decoding unit 1016 executes the decoding when the first view component D023 is not in synchronization with the second view component D022, at least the decoding using the inter-view prediction cannot probably be performed. Thus, when the second view component D022 is coded using the inter-view prediction, the view component type-B decoding unit 1016 may abandon the decoding and output the reconstructed picture D031 stored in the memory unit 1012 as the picture of the view 2 D035. In addition, when the second view component D022 is coded using the intra picture prediction or inter picture prediction, the view component type-B decoding unit 1016 may execute the normal decoding. Furthermore, regardless of the type of prediction, the view component type-B decoding unit 1016 may output the reconstructed picture D031 stored in the memory unit 1012 as the picture of the view 2 D035.

Some decoding apparatuses according to an embodiment in the present invention may not include the view component type B decoding unit 1016.

Figure 11:
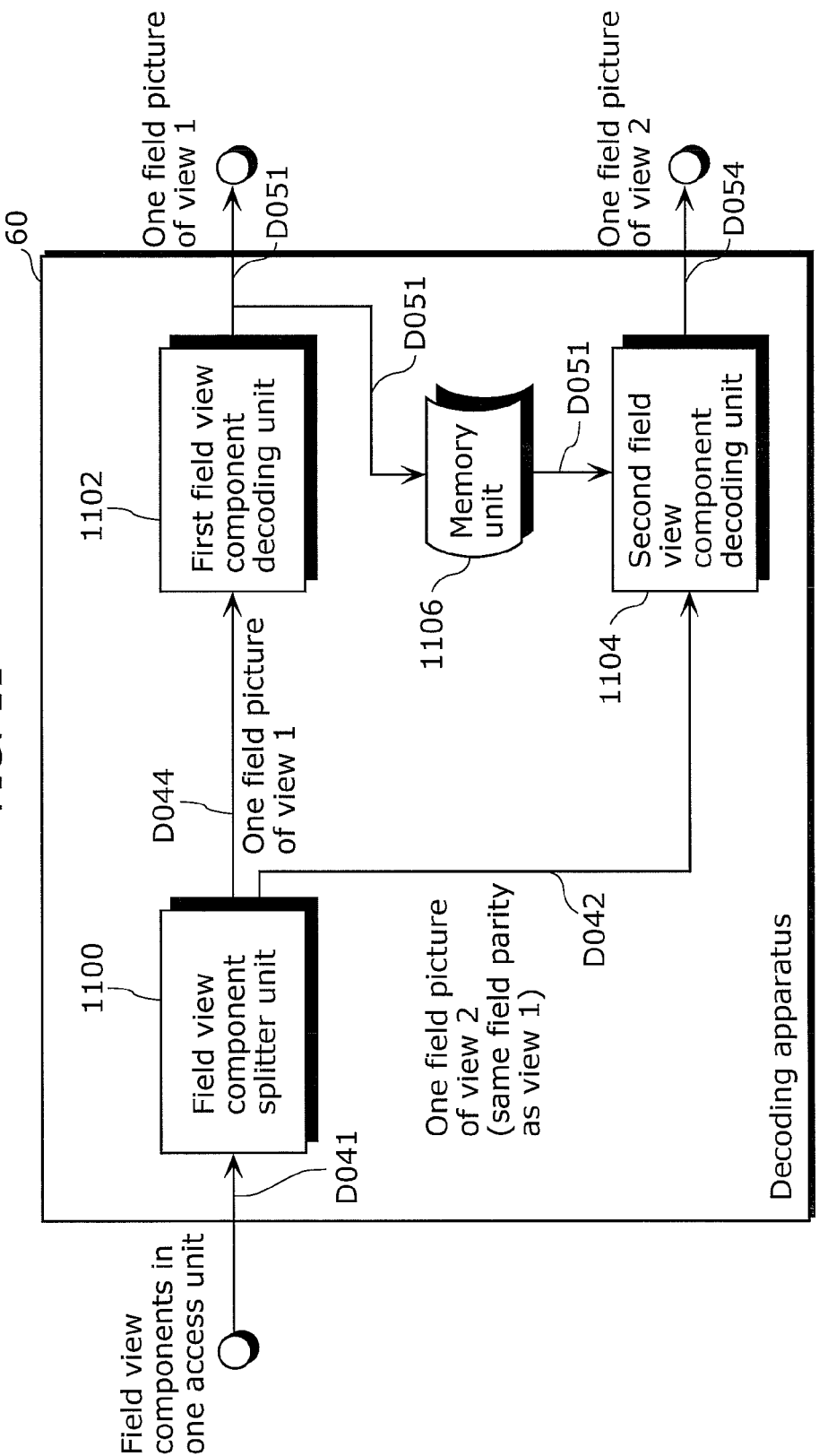
FIG. 11 is a variation of the decoding apparatus illustrated in FIG. 10.

FIG. 11 is a functional block diagram illustrating a decoding apparatus 60 that is a variation of the decoding apparatus 50. The decoding apparatus 60 includes a field view component splitter unit 1100, first and second field view component decoding units 1102 and 1104, and a memory unit 1106.

The field view component splitter unit 1100 reads a coded access unit D041, and splits the coded access unit D041 into the first and second view components D044 and D042. Then, the field view component splitter unit 1100 outputs the first view component D044 to the first field view component decoding unit 1102, and the second view component D042 to the second field view component decoding unit 1104.

The first view component D044 is a picture of the view 1 (base view) that does not depend on the second view component D042 for the correct reconstruction of the picture. In contrast, the second view component D042 is a picture of the view 2 (dependent view) that depends on the first view component D044 for the correct reconstruction of the picture.

Furthermore, each of the first and second view components D042 and D044 can be a single field picture.

The first view component decoding unit 1102 decodes the first view component D044 that belongs to the obtained view 1 and is on a per-field basis, and outputs a picture of the view 1D051. The reconstructed picture of the view 1D051 is also stored in the memory unit 1106. The memory unit 1106 contains a memory buffer to store the reconstructed picture of the view 1D051 outputted by the first field view component decoding unit 1102.

The second field view component decoding unit 1104 decodes the second view component D042 that belongs to the obtained view 2 and is on a per-field basis, using the reconstructed picture of the view D051 obtained from the memory unit 1106, and outputs a reconstructed picture of view 2 D054.

Figure 12:
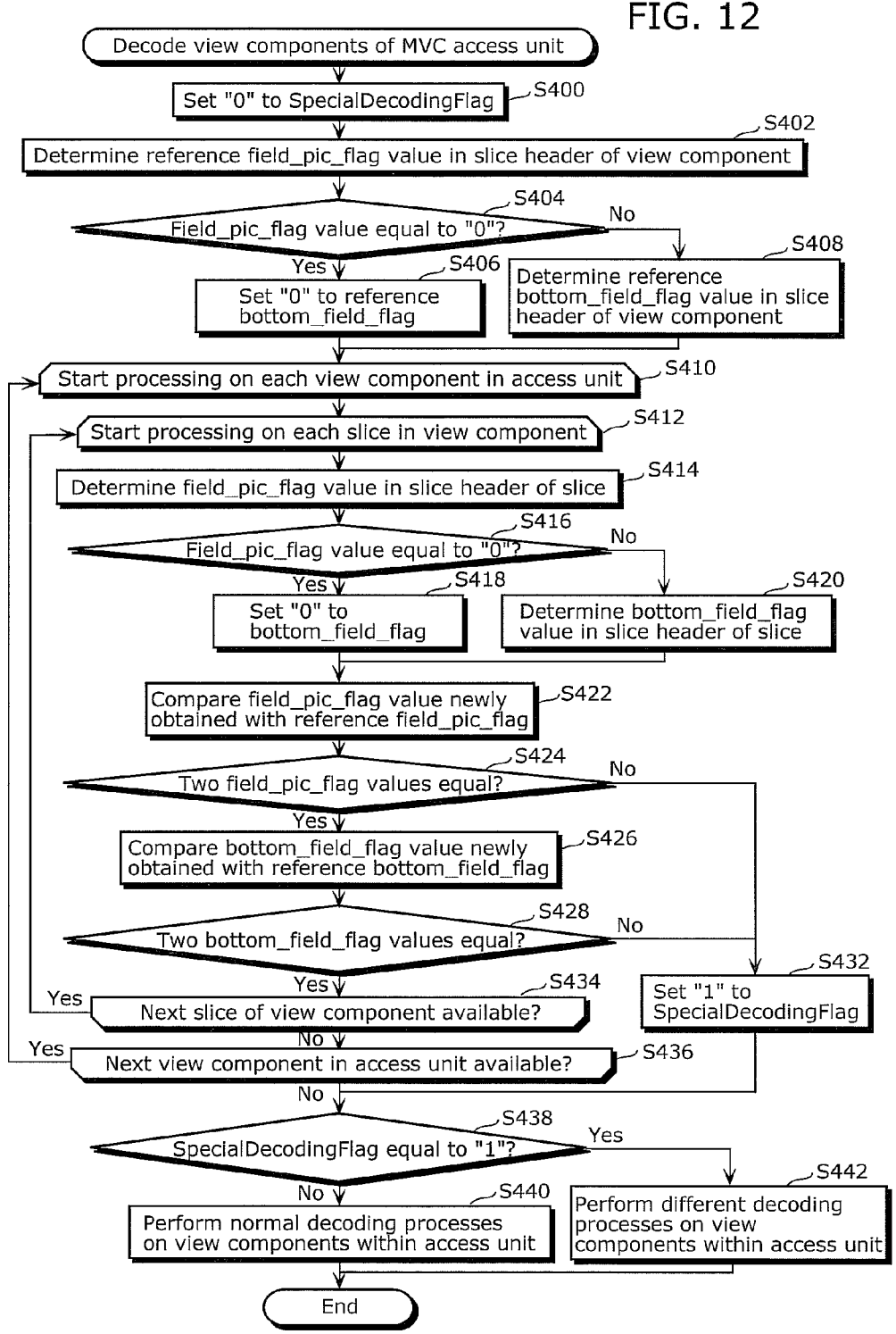
FIG. 12 shows a flowchart of decoding processes for view components in an MVC access unit.

FIG. 12 shows a flowchart of decoding processes for view components in an access unit. First, the comparator unit 1006 sets "0" to a parameter SpecialDecodingFlag (S400). This SpecialDecodingFlag is used to determine whether normal decoding processes as specified by the MVC standard are used for the decoding of all the second view components D022 in the access unit, or different decoding processes are used for the decoding of some of the view components in the access unit. In other words, the SpecialDecodingFlag corresponds to the control signal D027 in FIG. 10.

As shown in FIG. 12, the first slice header parser unit 1002 determines a reference field_pic_flag value from a slice header of one slice of the first view component D023 of the "base view" (S402). This reference field_pic_flag value is used later to compare it with the field_pic_flag values found in the slice headers of other view components.

Next, when the field_pic_flag value is not equal to "0" (No in S404), the first slice header parser unit 1002 determines a reference bottom_field_flag value from a slice header of one slice of the first view component D023 (S408). In contrast, when the field_pic_flag value is equal to "0" (Yes in S404), the first slice header parser unit 1002 sets "0" to a reference bottom_field_flag value (S406). This reference bottom_field_ flag value is used later to compare it with the bottom_field_flag values found in the slice headers of other view components.

Next, the following processes are executed on each slice (S412 to S434) of each view component (S410 to S436) of the "dependent view", within the same access unit. First, the second slice header parser unit 1004 determines the field_pic_ flag value from the slice header of the slice (S414). When the field_pic_flag value is not equal to "0" (No in S416), the second slice header parser unit 1004 determines the bottom_field_flag value from the slice header of the slice (S420). In contrast, when the field_pic_flag value is equal to "0" (Yes in S416), the second slice header parser unit 1004 sets "0" to the bottom_field_flag value (S418).

Next, the comparator unit 1006 compares the field_pic_ flag and bottom_field_flag values obtained from the second slice header parser unit 1004 with the reference field_pic_flag and the reference bottom_field_flag values obtained from the first slice header parser unit 1002, respectively (S422 and S426).

When the field_pic_flag value is not equal to the reference field_pic_flag value (No in S424), the comparator unit 1006 sets "1" to the parameter SpecialDecodingFlag (S432). Similarly, when the bottom_field_flag value is not equal to the reference bottom_field_flag value (No in S428), the comparator unit 1006 sets "1" to the parameter SpecialDecodingFlag (S432). Then, the comparator unit 1006 outputs the value of the parameter SpecialDecodingFlag (that is, control signal D027) to the switch unit 1010.

Finally, the switch unit 1010 compares the parameter SpecialDecodingFlag with "1" (S438). When the parameter SpecialDecodingFlag is not equal to "1" (No in S438), the decoding processes as specified by the MVC standard are used to decode all the view components within the access unit (S440). In contrast, when the parameter SpecialDecodingFlag is equal to "1" (Yes in S438), different decoding processes are used for the view components of "dependent view" of the access unit (S442).

One example of the different decoding processes involves the correct reconstruction of only one view component within the access unit by a video decoder.

Although Embodiment 1 exemplifies a case where moving pictures captured at two different views, that is, the views 1 and 2 are coded, the number of views are not limited to two. In other words, the present invention may be applicable to a case where moving pictures captured at least two different views are coded.

Embodiment 2

The processing described in Embodiment 1 can be simply implemented by an independent computer system, by recording, in a recording medium, a program for implementing the configurations for the picture coding method and the picture decoding method described in Embodiment 1. The recording medium may be any recording medium as long as the program can be recorded, such as a magnetic disk, an optical disk, a magnetic optical disk, an IC card, and a semiconductor memory.

Hereinafter, the applications to the picture coding method and the picture decoding method described in Embodiment 1 and systems using thereof will be described.

Figure 13:
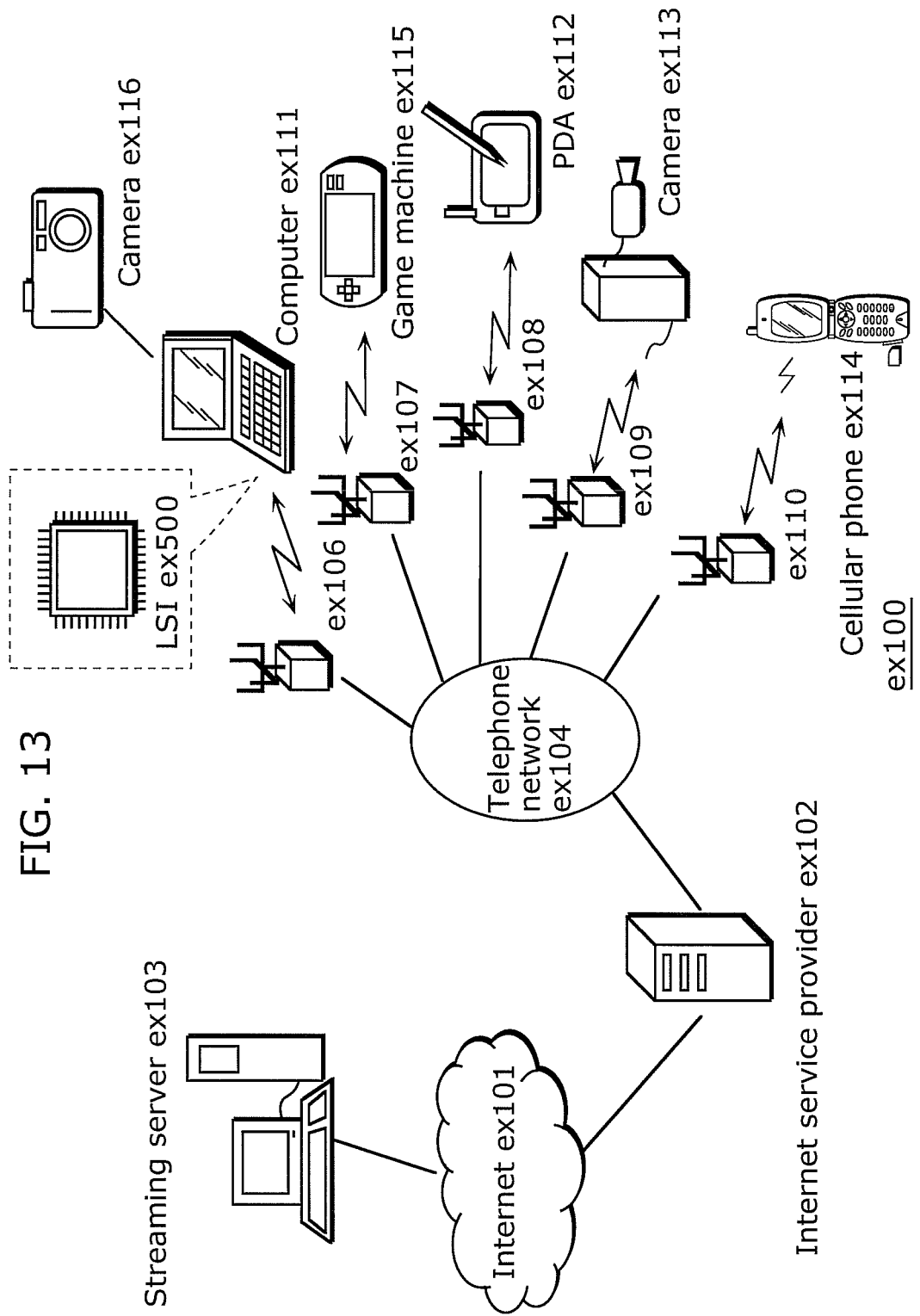
FIG. 13 schematically illustrates an overall configuration of a content providing system for implementing content distribution services.

FIG. 13 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110.

However, the configuration of the content providing system ex100 is not limited to the configuration shown in FIG. 13, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving pictures. A camera ex116, such as a digital video camera, is capable of capturing both still pictures and moving pictures. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still pictures and moving pictures captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding pictures may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the picture coding method and the picture decoding method shown in Embodiment 1 may be used.

The cellular phone ex114 will be described as an example of such a device.

Figure 14:
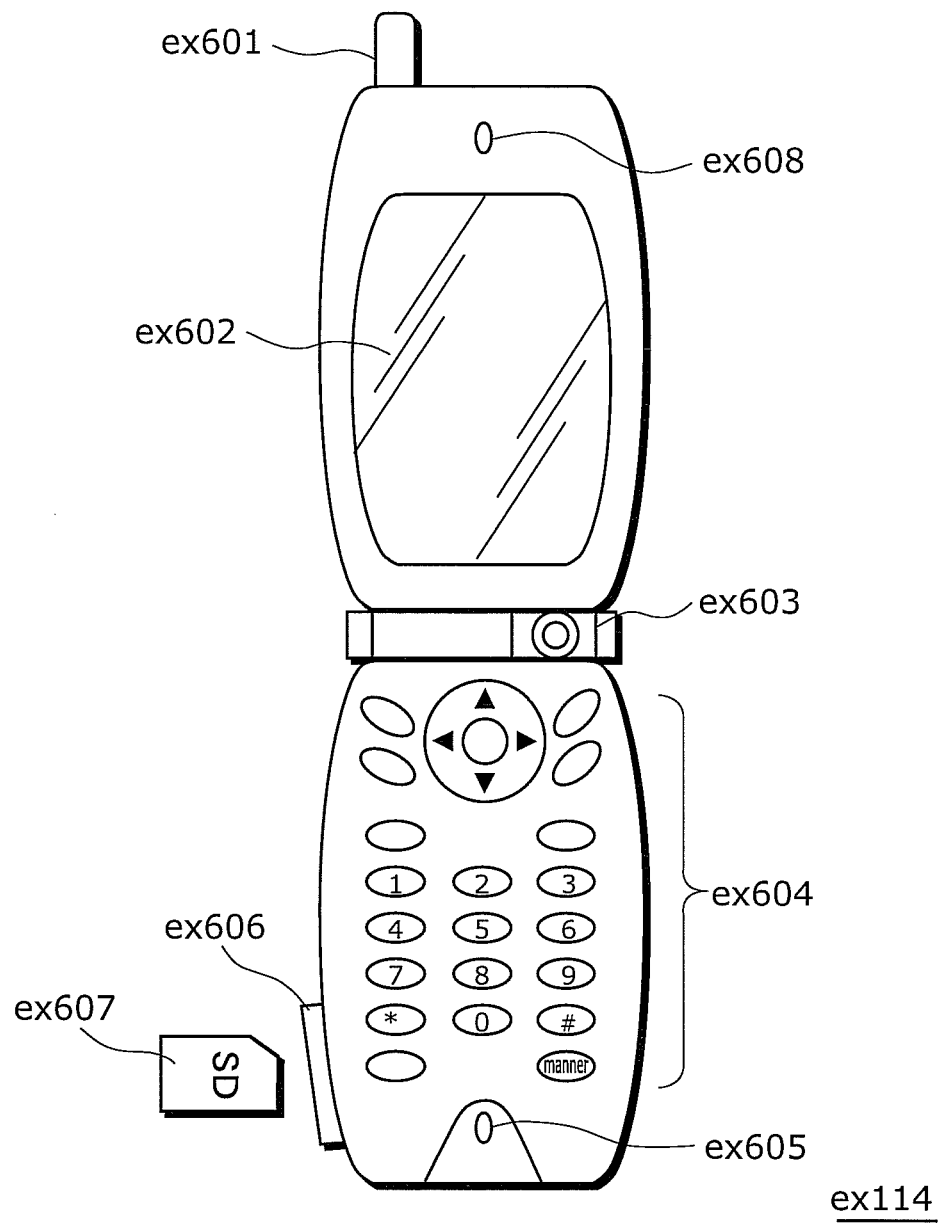
FIG. 14 illustrates an external view of a cellular phone.

FIG. 14 illustrates the cellular phone ex114 that uses the picture coding method and the picture decoding method described in Embodiment 1. The cellular phone ex114 includes: an antenna ex601 for transmitting and receiving radio waves through the base station ex110; a camera unit ex603 such as a CCD camera capable of capturing moving and still pictures; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still pictures, data of received e-mails, and data of moving or still pictures; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EE-PROM) which is a non-volatile memory that is electrically rewritable and erasable.

Figure 15:
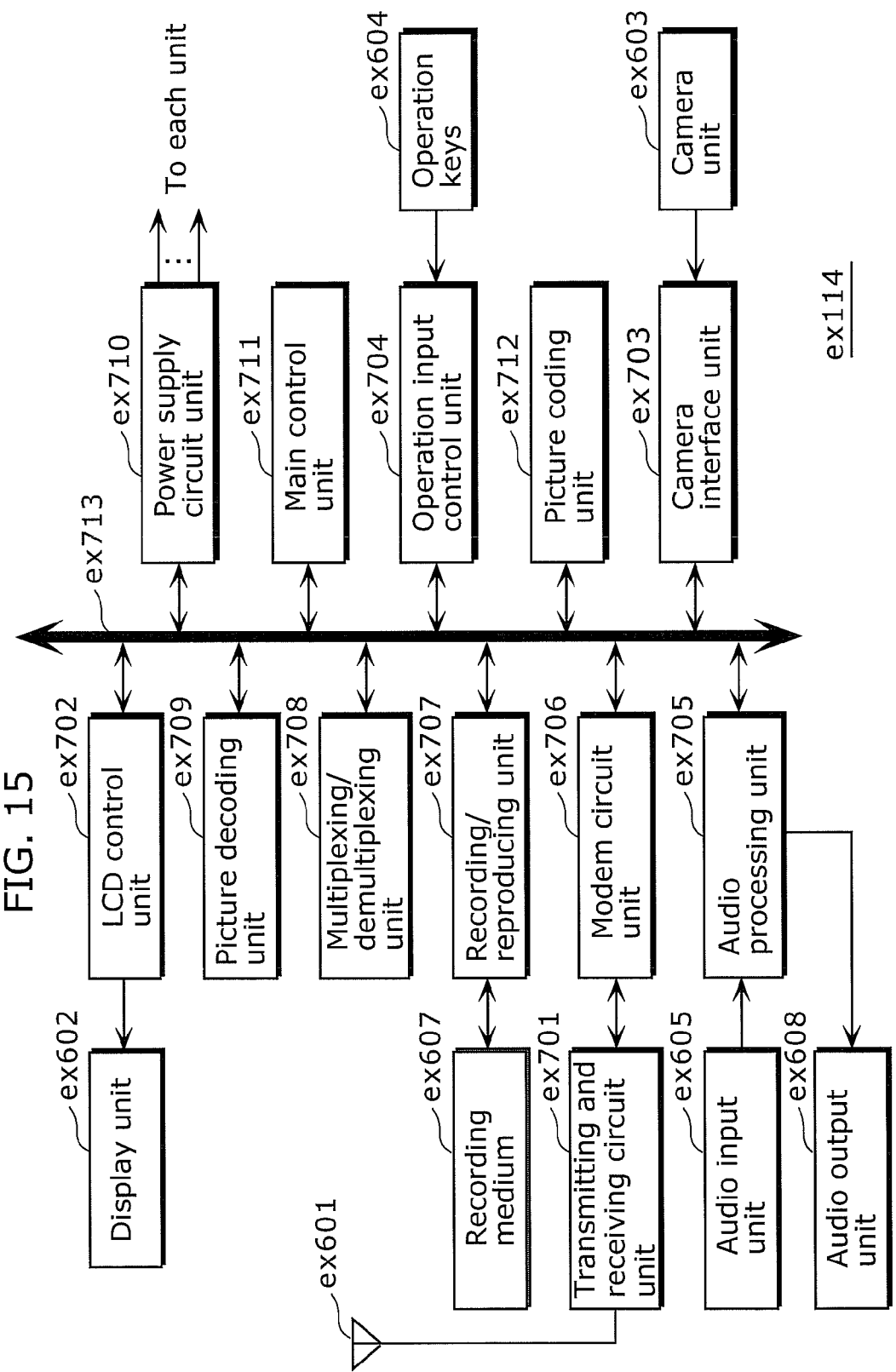
FIG. 15 is a block diagram illustrating an example of a configuration of a cellular phone.

Next, the cellular phone ex114 will be described with reference to FIG. 15. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, a picture coding unit ex712, a camera interface unit ex703, a liquid crystal display (LCD) control unit ex702, a picture decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When picture data is transmitted in data communication mode, the picture data captured by the camera unit ex603 is supplied to the picture coding unit ex712 via the camera interface unit ex703. When the picture data is not transmitted, the picture data captured by the camera unit ex603 can be displayed directly on the display unit ex602 via the camera interface unit ex703 and the LCD control unit ex702.

The picture coding unit ex712 including the picture coding apparatus as described for the present invention compresses and codes the picture data supplied from the camera unit ex603 using the coding method employed by the picture coding apparatus as shown in Embodiment 1 so as to transform the data into coded picture data, and sends the data out to the multiplexing/demultiplexing unit ex708. Furthermore, the cellular phone ex114 simultaneously sends out, as digital audio data, the audio received by the audio input unit ex605 during the capturing with the camera unit ex603 to the multiplexing/demultiplexing unit ex708 via the audio processing unit ex705.

The multiplexing/demultiplexing unit ex708 multiplexes the coded picture data supplied from the picture coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bit stream of picture data and that of audio data, and supplies the coded picture data to the picture decoding unit ex709 and the audio data to the audio processing unit ex705, respectively via the synchronous bus ex713.

Next, the picture decoding unit ex709 including the picture decoding apparatus as described for the present invention decodes the bit stream of the picture data using the decoding method corresponding to the coding method as shown in Embodiment 1 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 16:
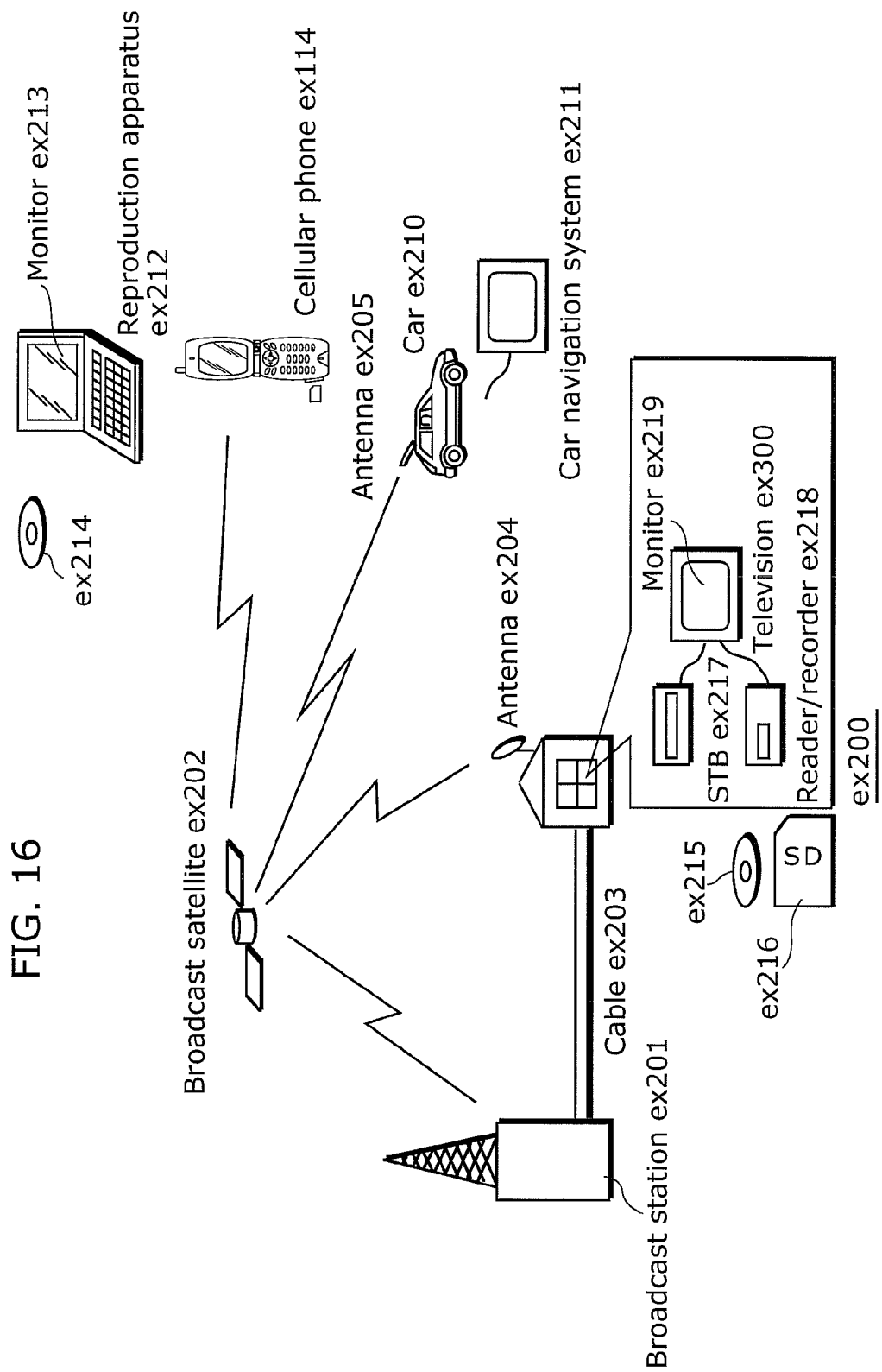
FIG. 16 schematically illustrates an example of an overall configuration of a digital broadcasting system.

The present invention is not limited to the above-mentioned system because terrestrial or satellite digital broadcasting has been in the news lately, and at least either the picture coding apparatus or the picture decoding apparatus described in Embodiment 1 can be incorporated into a digital broadcasting system as shown in FIG. 16. More specifically, a broadcast station ex201 communicates or transmits, via radio waves to a broadcast satellite ex202, audio data, video data, or a bit stream obtained by multiplexing the audio data and the video data. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bit stream and reproduces the decoded bit stream. Furthermore, a reader/recorder ex218 that reads and decodes such a bit stream obtained by multiplexing picture data and audio data that are recorded on recording media ex215 and 216, such as a CD and a DVD may include the picture decoding apparatus as shown in Embodiment 1. In this case, the reproduced video signals are displayed on a monitor ex219. It is also possible to implement the picture decoding apparatus in the set top box ex217 connected to a cable ex203 for a cable television or an antenna ex204 for satellite and/or terrestrial broadcasting, so as to reproduce the video signals on the monitor ex219 of the television ex300. The picture decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the picture decoding apparatus or the picture coding apparatus as shown in Embodiment 1 can be implemented in the reader/recorder ex218 (i) for reading and decoding the video data, the audio data, or the coded bit stream obtained by multiplexing the video data and the audio data, or (ii) for coding the video data, the audio data, or the coded bit stream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bit stream is recorded. For example, another reproduction apparatus ex212 can reproduce the video signals on a monitor ex213, using a recording medium ex214 on which the coded bit stream is copied.

Furthermore, it is also possible to implement the picture decoding apparatus in the set top box ex217 connected to the cable ex203 for a cable television or the antenna ex204 for satellite and/or terrestrial broadcasting, so as to reproduce the video signals on the monitor ex219 of the television ex300. The picture decoding apparatus may be included not in the set top box but in the television ex300.

Figure 17:
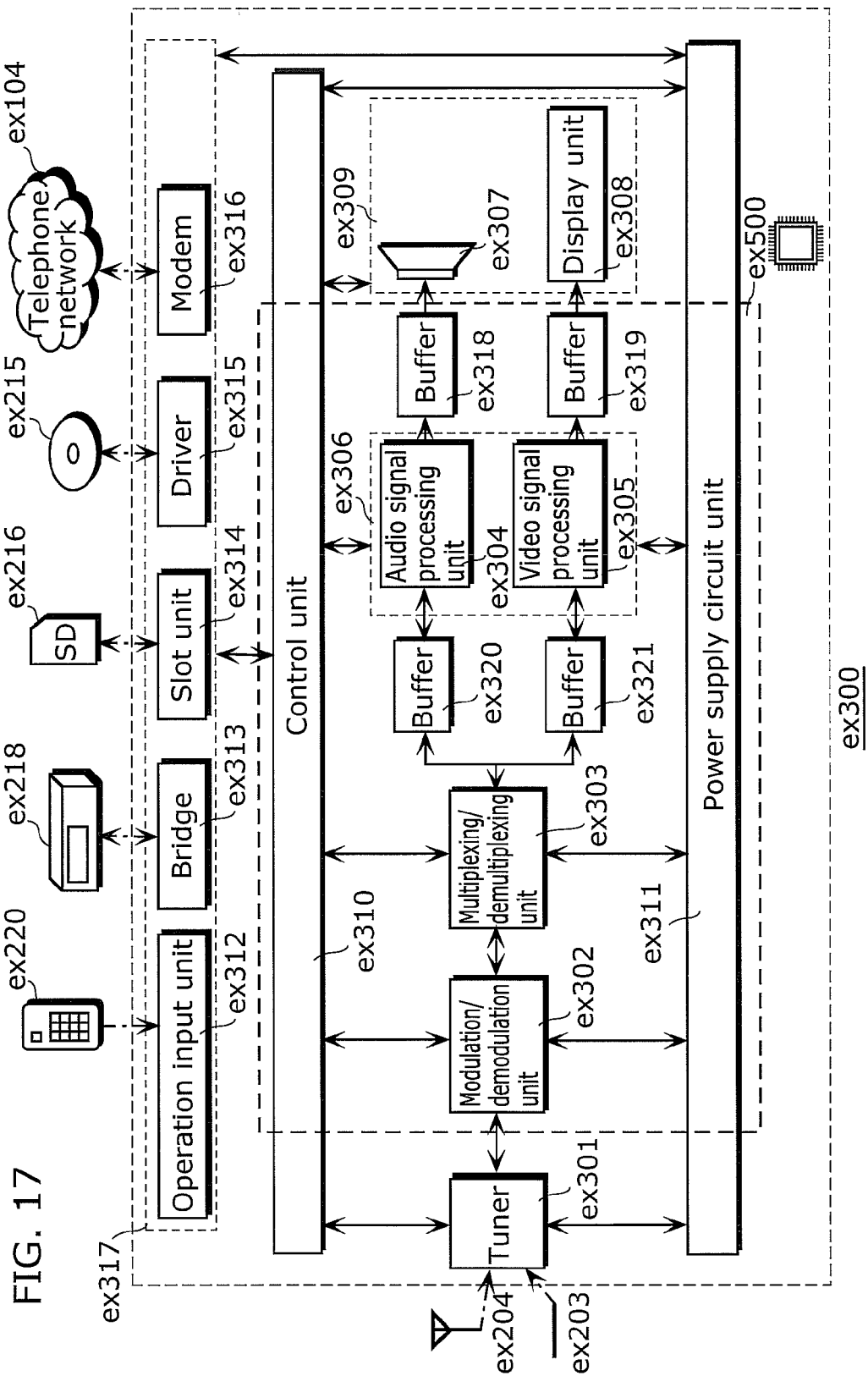
FIG. 17 is a block diagram illustrating an example of a configuration of a television.

FIG. 17 illustrates the television (receiver) ex300 that uses the picture coding method and the picture decoding method described in Embodiment 1. The television ex300 includes: a tuner ex301 that obtains or provides a bit stream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bit stream not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 18:
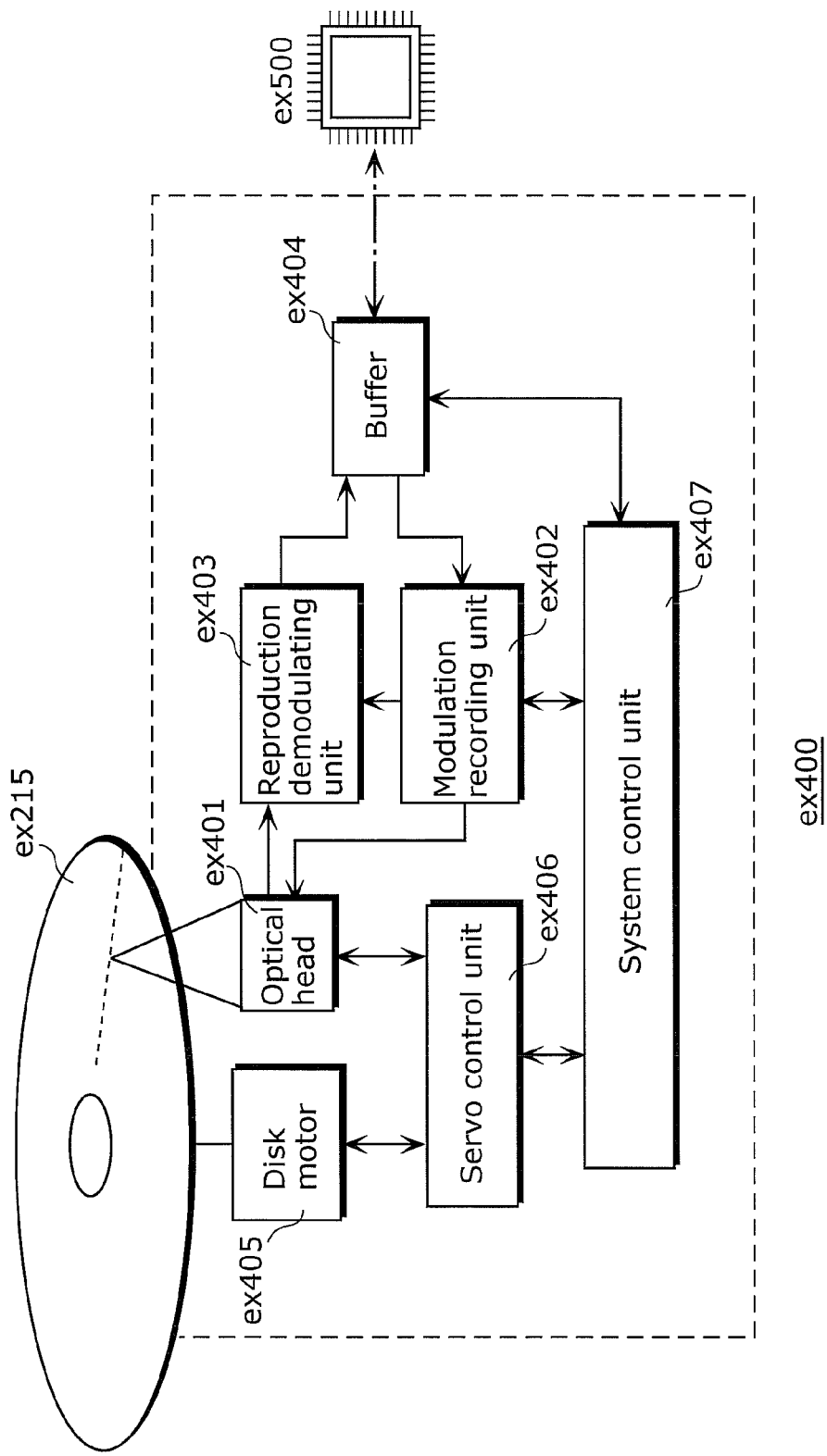
FIG. 18 is a block diagram illustrating an example of a configuration of an information reproducing/recording unit that reads and writes information from or on a recording medium that is an optical disk.

As an example, FIG. 18 illustrates a configuration of an information reproducing/recording unit ex400 when data is read or written from or in an optical disk. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
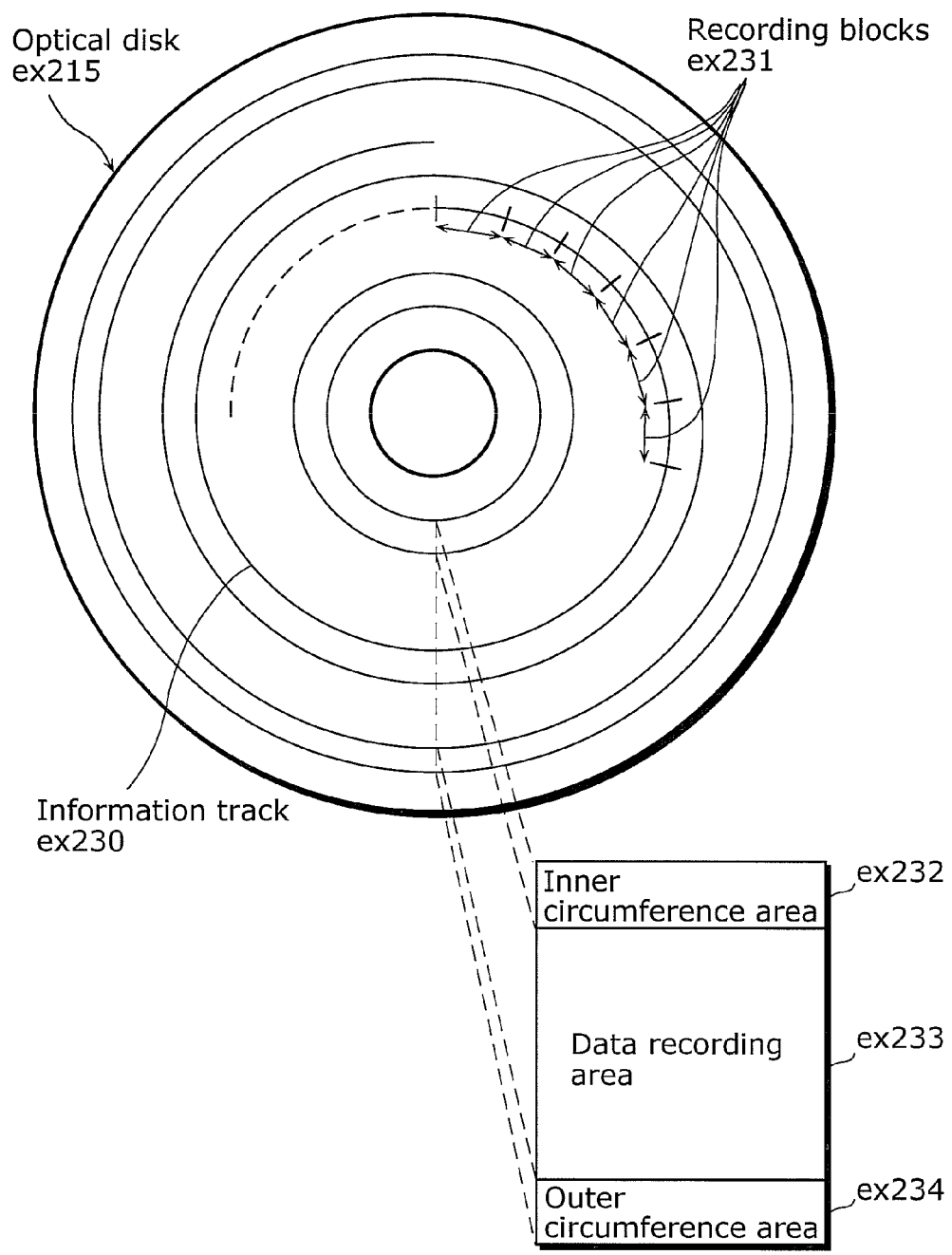
FIG. 19 illustrates an example of a configuration of a recording medium that is an optical disk.

FIG. 19 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the picture coding method and the picture decoding method in Embodiment 1 can be used in any of the devices and systems described. Thus, the advantages described in Embodiment 1 can be obtained.

Furthermore, the present invention is not limited to Embodiments, and various modifications and revisions are possible without departing from the scope of the present invention.

Embodiment 3

Figure 20:
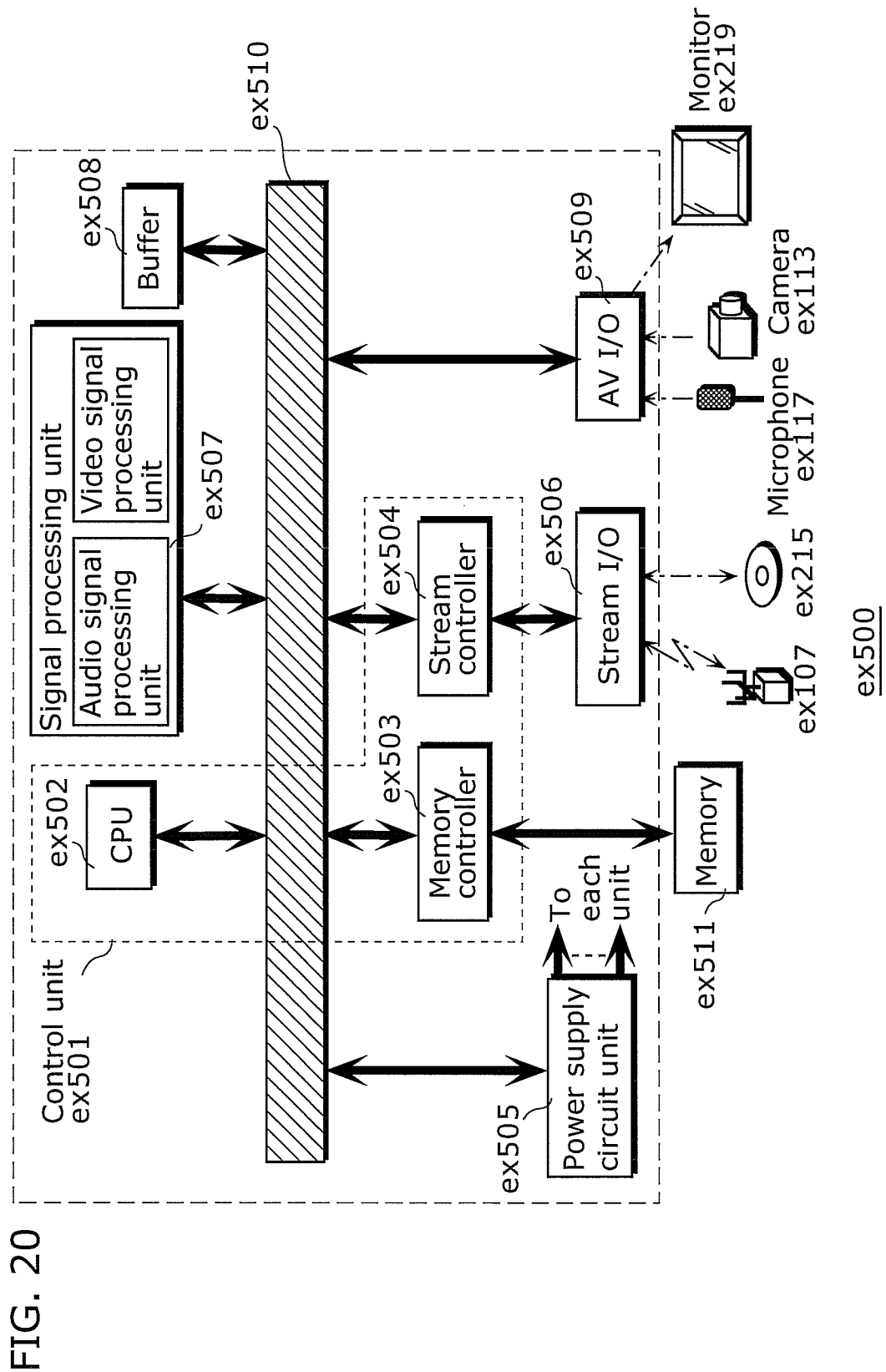
FIG. 20 is a block diagram illustrating an example of a configuration of an integrated circuit for implementing the picture coding method and the picture decoding method according to each of Embodiments.

Each of the picture coding method, the picture coding apparatus, the picture decoding method, and the picture decoding apparatus in each of Embodiments is typically achieved in the form of an integrated circuit or a Large Scale Integrated (LSI) circuit. As an example of the LSI, FIG. 20 illustrates a configuration of the LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bit stream is transmitted to a base station ex107, or written on the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Although the coding method, the coding apparatus, the decoding method, and the decoding apparatus in the present invention are described based on Embodiments, the present invention is not limited to Embodiments. Without departing from the scope of the present invention, the present invention includes an embodiment with some modifications on Embodiments that are conceived by a person skilled in the art, and another embodiment obtained through combinations of the constituent elements and steps of different Embodiments in the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is advantageously used as a coding method and a decoding method.

What is claimed is:

1. A method comprising:
a step of determining a first coding basis, as one of a per-field basis and a per-frame basis, that applies to both an interlaced picture 1 and an interlaced picture 2 both included in an access unit, wherein a view point at which the interlaced picture 1 is captured is different from a view point at which the interlaced picture 2 is captured;
a step of determining a second coding basis, as one of a per-top-field basis and a per-bottom-field basis, that applies to both the interlaced picture 1 and the interlaced picture 2, when the determined first coding basis is the per-field basis; and
a step of (i) coding the interlaced picture 1 and the interlaced picture 2, both included in the access unit, on the determined first coding basis, when the determined first coding basis is the per-frame basis and (ii) coding the interlaced picture 1 and the interlaced picture 2, both included in the access unit, on the determined second coding basis, when the determined first coding basis is the per-field basis.

2. The method according to claim 1, further comprising:
a step of attaching a first flag 1 (field_pic_flag) indicating the first coding basis to a header regarding the coded picture 1 and attaching a first flag 2 (field_pic_flag) indicating the first coding basis to a header regarding the coded picture 2, wherein the first flag 1 is a same value as the first flag 2; and
a step of attaching a second flag 1 (bottom_field_flag) indicating the second coding basis to a header regarding the coded picture 1 and attaching a second flag 2 (bottom_field_flag) indicating the second coding basis to a header regarding the coded picture 2, wherein the second flag 1 is a same value as the second flag 2.

* * * * *